United States Patent
Katayama et al.

(10) Patent No.: US 11,369,935 B2
(45) Date of Patent: Jun. 28, 2022

(54) HOLLOW PARTICLES AND USE THEREOF

(71) Applicant: SEKISUI PLASTICS CO., LTD., Osaka (JP)

(72) Inventors: Yugo Katayama, Nara (JP); Tsuyoshi Saito, Nara (JP); Haruhiko Matsuura, Nara (JP); Atsushi Kotani, Nara (JP); Momoka Noda, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 177 days.

(21) Appl. No.: 16/333,793

(22) PCT Filed: Aug. 30, 2017

(86) PCT No.: PCT/JP2017/031241
§ 371 (c)(1),
(2) Date: Mar. 15, 2019

(87) PCT Pub. No.: WO2018/051794
PCT Pub. Date: Mar. 22, 2018

(65) Prior Publication Data
US 2019/0209994 A1   Jul. 11, 2019

(30) Foreign Application Priority Data

Sep. 16, 2016 (JP) ............................. JP2016-182315
Feb. 27, 2017 (JP) ............................. JP2017-035422

(51) Int. Cl.
*B01J 13/18* (2006.01)
*B01J 13/20* (2006.01)
*C08L 43/04* (2006.01)
*C08K 5/5419* (2006.01)
*C08K 5/521* (2006.01)
*C08G 59/32* (2006.01)
*C08F 8/00* (2006.01)
*C08F 20/32* (2006.01)
*C09D 201/00* (2006.01)
*C08F 2/26* (2006.01)

(52) U.S. Cl.
CPC ............. *B01J 13/18* (2013.01); *B01J 13/20* (2013.01); *C08F 2/26* (2013.01); *C08F 8/00* (2013.01); *C08F 20/32* (2013.01); *C08G 59/32* (2013.01); *C08K 5/521* (2013.01); *C08K 5/5419* (2013.01); *C08L 43/04* (2013.01); *C09D 201/00* (2013.01); *C08L 2201/54* (2013.01); *C08L 2201/56* (2013.01); *C08L 2205/20* (2013.01)

(58) Field of Classification Search
None
See application file for complete search history.

(56) References Cited

U.S. PATENT DOCUMENTS

| 2009/0078156 | A1* | 3/2009 | Chasser | C08G 77/54 106/287.11 |
|---|---|---|---|---|
| 2009/0098381 | A1* | 4/2009 | Nakayama | B01J 13/14 428/402.22 |
| 2011/0020648 | A1* | 1/2011 | Fukazawa | C08F 220/22 428/402.22 |
| 2017/0114243 | A1 | 4/2017 | Katayama et al. | |
| 2019/0100637 | A1 | 4/2019 | Katayama et al. | |

FOREIGN PATENT DOCUMENTS

| EP | 3434707 A1 | 1/2019 |
|---|---|---|
| JP | 3-50250 | 3/1991 |
| JP | 2007-70484 | 3/2007 |
| JP | 2009-244684 | 10/2009 |
| JP | 2010-32719 | 2/2010 |
| JP | 2010-84017 | 4/2010 |
| JP | 2010-84018 | 4/2010 |
| JP | 2013-040232 | 2/2013 |
| JP | 2015-063577 | 4/2015 |
| WO | 2006/109747 | 10/2006 |
| WO | 2016/111314 | 7/2016 |
| WO | 2017/163439 A1 | 9/2017 |

OTHER PUBLICATIONS

Machine translation JP2010-84017 (Year: 2010).*
International Search Report in International Patent Application No. PCT/JP2017/031241, dated Nov. 28, 2017, along with an English translation thereof.
International Preliminary Report on Patentability issued with respect to Patent Application No. PCT/JP2017/031241, dated. Mar. 19, 2019.
Japanese Office Action dated Mar. 31, 2020 for the corresponding JP patent application No. 2018-539620, with English translation thereof.
Supplementary Extended European Search Report dated Apr. 23, 2020, for the corresponding European patent application No. 17850697. 8.

* cited by examiner

*Primary Examiner* — Alexandre F Ferre
(74) *Attorney, Agent, or Firm* — Wenderoth, Lind & Ponack, L.L.P.

(57) ABSTRACT

Hollow particles having a shell including at least one layer, wherein the at least one layer contains a vinyl-based resin, and contains a phosphorus atom and/or a sulfur atom.

11 Claims, No Drawings

HOLLOW PARTICLES AND USE THEREOF

TECHNICAL FIELD

The present invention relates to hollow particles and use thereof. The hollow particles of the present invention can provide a cured article that has high dispersibility in an organic solvent or a curable resin, and has scratch resistance by curing a curable resin composition containing the above-mentioned hollow particles.

BACKGROUND TECHNOLOGY

Particles having cavities therein are used as microcapsule particles by incorporating various substances in the cavities. Additionally, these particles having cavities therein are also called hollow particles, and are used as a light scattering material, a low reflection material, a heat-insulating material or the like. These materials are used as a light scattering film, a low reflection film, a heat-insulating film or the like, by adding them to a thermosetting or thermoplastic resin, followed by molding into a plate shape.

However, there is a problem that when the hollow particles are added to a thermosetting or thermoplastic resin and molded, the mechanical strength of a molded article, particularly, the scratch resistance of the surface is reduced. A technique that solves this problem is proposed in Japanese Unexamined Patent Application, First Publication No. 2010-084017 (Patent Document 1) and Japanese Unexamined Patent Application, First Publication No. 2010-084018 (Patent Document 2). In these patent documents, hollow particles that are surface-treated with an alkoxysilane, and further surface-treated with a silane coupling agent having a radical polymerizable group are described.

PRIOR ART DOCUMENTS

Patent Documents

Patent Document 1: Japanese Unexamined Patent Application, First Publication No. 2010-084017
Patent Document 2: Japanese Unexamined Patent Application, First Publication No. 2010-084018

SUMMARY OF THE INVENTION

Problem to be Solved By The Invention

However, even with the hollow particles of the above-mentioned patent documents, since the dispersibility in an organic solvent or a curable resin is low, or an introduction amount of a reactive group is insufficient, a molded article having sufficient scratch resistance cannot be obtained.

Means For Solving the Problem

Thus, the present invention provides hollow particles having a shell including at least one layer, wherein the at least one layer contains a vinyl-based resin, and contains a phosphorus atom and/or a sulfur atom.

Moreover, the present invention provides a dispersion liquid containing the hollow particles.

Furthermore, the present invention provides a coating agent containing the hollow particles.

Moreover, the present invention provides a heat-insulating film containing the hollow particles.

Furthermore, the present invention provides a laminate having at least a substrate, and a cured resin layer containing the hollow particles, wherein when subjected to the bend test (cylindrical mandrel method) described in JIS K5600-5-1: 1999, the cured resin layer has such a bending resistance that the cured resin layer begins to crack at a mandrel diameter of 8 mm or less.

Effects of Invention

The present invention can provide hollow particles suitable for preparing a molded article having sufficient scratch resistance.

When the present invention has any of the following aspects, the present invention can provide hollow particles suitable for preparing a molded article having more sufficient scratch resistance.

(1) A phosphorus atom or a sulfur atom exhibits a content of 0.2 to 5.00% by mass by fluorescent X-ray analysis.

(2) When a ratio α (absorbance ratio α: A810/A1720) between absorbance at 810 cm$^{-1}$ (A810) and absorbance at 1720 cm$^{-1}$ (A1720) is calculated from an infrared absorption spectrum obtained by measuring the hollow particles by ATR-FTIR, the hollow particles exhibit an absorbance ratio α of 0.015 to 0.50.

(3) The vinyl-based resin is an organic-inorganic hybrid vinyl-based resin containing a silicon component.

(4) The hollow particles have an average particle diameter of 10 to 150 nm.

(5) The hollow particles have a surface treated with a silane-based coupling agent represented by the following general formula (I):

[Chemical formula 1]

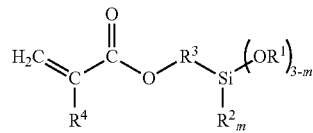

wherein R$^1$s represent respectively independently a substituted or unsubstituted alkyl group having 1 to 6 carbon atoms, a substituted or unsubstituted alkoxyalkyl group having 2 to 4 carbon atoms, or a substituted or unsubstituted phenyl group; R$^2$s represent respectively independently a substituted or unsubstituted alkyl group having 1 to 6 carbon atoms, a substituted or unsubstituted alkoxyalkyl group having 2 to 4 carbon atoms, or a substituted or unsubstituted phenyl group; R$^3$ represents a divalent organic group having 1 to 30 carbon atoms; R$^4$ represents a hydrogen atom or a methyl group; and m represents an integer of 0 to 2.

BEST MODE FOR CARRYING OUT THE INVENTION (Hollow Particles)
The hollow particles of the present invention have the following constitutions:
(i) the hollow particles have a shell including at least one layer;
(ii) the at least one layer contains a vinyl-based resin; and
(iii) the at least one layer contains a phosphorus atom and/or a sulfur atom.

Due to the above-mentioned constitutions (i) to (iii), hollow particles suitable for preparing a molded article having sufficient scratch resistance can be provided. In particular, the constitution (iii) improves the physical strength of hollow particles, and as a result, can impart sufficient scratch resistance to a molded article containing the hollow particles.

(i) Shell

The hollow particles have a shell including at least one layer. A layer constituting the shell may be composed of one layer, or may be a multilayer composed of two or more layers.

(ii) Vinyl-Based Resin

The at least one layer contains a vinyl-based resin. The vinyl-based resin is a resin containing a moiety formed of a vinyl-based monomer. In particular, a vinyl-based resin formed of a vinyl-based monomer having no aromatic ring is preferable since it has high weather resistance, and can suppress yellowing with the lapse of time. The whole shell may be made of the vinyl-based resin. It is preferable that the vinyl-based resin is a polymer obtained by crosslinking a polymer of a radical reactive monomer having at least one kind of an epoxy group or an oxetane group, with a crosslinkable monomer such as a polyamine-based compound. The vinyl-based resin will be specifically described in another section below.

(iii) Phosphorus Atom and/or Sulfur Atom

The at least one layer is a layer containing a phosphorus atom and/or a sulfur atom. Since these atoms are contained in at least one layer, the dispersibility of the hollow particles in a curable resin can be improved, and the physical strength of the hollow particles can be improved, and accordingly sufficient scratch resistance can be imparted to a molded article. Existence of the phosphorus atom and/or the sulfur atom in at least one layer can be confirmed by fluorescent X-ray analysis. The phosphorus atom and/or the sulfur atom may be incorporated by using a monomer containing the phosphorus atom and/or the sulfur atom in the vinyl-based resin itself. In particular, it is preferable that the phosphorus atom and/or the sulfur atom are incorporated in at least one layer by performing surface treatment with a surface treating agent containing the phosphorus atom and/or the sulfur atom described below. Additionally, the whole shell may be a layer containing the phosphorus atom and/or the sulfur atom, or the phosphorus atom and/or the sulfur atom may be incorporated in only a part of layers. It is preferable that the content of the phosphorus atom or the sulfur atom is 0.2 to 5.00% by mass. When the content is less than 0.2% by mass, sufficient scratch resistance may not be imparted to a molded article containing the hollow particles. When the content is greater than 5.00% by mass, the dispersibility of the hollow particles in a curable resin is reduced, and the hardness of a molded article becomes too high, and accordingly the scratch resistance may be reduced. The content can be 0.2% by mass, 0.3% by mass, 0.5% by mass, 1.00% by mass, 1.50% by mass, 2.00% by mass, 2.50% by mass, 3.00% by mass, 3.50% by mass, 4.00% by mass, 4.50% by mass or 5.00% by mass. The content is more preferably 0.2 to 4.00% by mass, and further preferably 0.3 to 3.00% by mass. Either one of the phosphorus atom and the sulfur atom may be contained in at least one layer, or both the atoms may be contained therein. When both the atoms are contained, the content thereof can be 0.2 to 10.0% by mass.

(iv) Other Physical Properties

Furthermore, it is preferable that when a ratio $\alpha$ (absorbance ratio $\alpha$: A810/A1720) between absorbance at 810 $cm^{-1}$ (A810) and absorbance at 1720 $cm^{-1}$ (A1720) is calculated from an infrared absorption spectrum obtained by measuring the hollow particles by ATR-FITR, the hollow particles exhibit an absorbance ratio $\alpha$ of 0.0115 to 0.50. The absorbance A810 is absorbance corresponding to an absorption spectrum derived from out-of-plane bending vibration of a vinyl group CH. Additionally, the absorbance A1720 is absorbance corresponding to an absorption spectrum derived from C=O stretching vibration of a carbonyl group. The absorbance ratio $\alpha$ can be used as an index showing an extent of an introduction amount of a radical reactive group into the hollow particles. Specifically, there is a tendency that the greater the absorbance ratio $\alpha$ is, the larger a radical reactive group introduced into particles. By introducing the radical reactive group into particles, the dispersibility in a curable resin and the adherence with resin after curing are enhanced, and a molded article having high scratch resistance is easily obtained. When the absorbance ratio $\alpha$ is less than 0.015, the dispersibility or the adherence of the hollow particles is reduced, and a molded article having low scratch resistance may be obtained. Basically, the larger the absorbance ratio $\alpha$ is, a molded article having higher scratch resistance is obtained. Accordingly, is preferable that the absorbance ratio $\alpha$ is large. However, when the absorbance ratio is greater than 0.50, the radical reactive group introduced into the hollow particles reacts with the lapse of time, and this may cause aggregation in a dispersion liquid. The absorbance ratio $\alpha$ can be 0.015, 0.020, 0.030, 0.050, 0.100, 0.150, 0.200, 0.250, 0.300, 0.350, 0.400, 0.450 or 0.50. The absorbance ratio $\alpha$ is more preferably 0.015 to 0.400, and further preferably 0.020 to 0.300.

It is preferable that the hollow particles have a hollow ratio of 10 to 90%. When the hollow ratio is less than 10%, a hollow part is small, and a desired property may not be obtained. When the hollow ratio is greater than 90%, a hollow part is too large, and the strength of the hollow particles may be reduced. The hollow ratio can be 10%, 20%, 30%, 40%, 50%, 60%, 70%, 80% or 90%. A more preferable hollow ratio is 10 to 80%, and a further preferable hollow ratio is 10 to 70%.

The hollow particles preferably have a CV value that is an index for evaluating the monodispersibility of 30% or less. When the CV value exceeds 30%, the scratch resistance may be reduced due to the presence of coarse particles. The CV value can be 0%, 5%, 10%, 15%, 20%, 25% or 30%. The CV value is more preferably 25% or less, and further preferably 20% or less.

It is preferable that there are a small number of pinholes in the shell of the hollow particles. When the number of pinholes in the shell is large, a low-molecular binder component easily enters a hollow internal part. For that reason, when the hollow particles are used in a low refractive index material, the refractive index may not be made sufficiently low, and when the hollow particles are used as a heat conductivity adjusting agent, the heat conductivity may not be adjusted.

It is preferable that the hollow particles have an average particle diameter of 10 to 150 nm. Hollow particles having an average particle diameter less than 10 nm may be inferior in the handleability, due to generation of aggregation between the hollow particles. When hollow particles greater than 150 nm are kneaded with a coating agent or a resin, unevenness of the surface or scattering at a particle interface may be large, and the hollow particles may be whitened. The average particle diameter can be 10 nm, 20 nm, 30 nm, 40 nm, 50 nm, 60 nm, 70 nm, 80 nm, 100 nm, 120 nm or 150 nm. The average particle diameter is more preferably 30 to 100 nm, and is further preferably 30 to 80 nm.

(v) Detailed Description of Vinyl-Based Resin

It is preferable that the vinyl-based resin is an organic-inorganic hybrid vinyl-based resin containing a silicon component (Si-containing resin). In the present specification, "organic-inorganic" means that silicon is an inorganic component, and a resin other than silicon is an organic component.

It is preferable that in measurement by XPS, the Si-containing resin has an abundance ratio Si of a silicon atom and an abundance ratio C of a carbon atom satisfying a relationship of $0.001 \leq Si/C \leq 0.1$. When Si/C is less than 0.001, the crosslinking density is reduced, and a low-molecular binder component may easily enter a hollow internal part. When Si/C exceeds 0.1, since the crosslinking density is too high, pinholes are easily generated, and a low-molecular binder component may easily enter a hollow internal part. Si/C can be 0.001, 0.002, 0.005, 0.01, 0.015, 0.02, 0.035, 0.05, 0.07 or 0.1. Si/C is more preferably 0.002 to 0.05, and further preferably 0.002 to 0.02.

It is preferable that the Si-containing resin is a Si-containing resin obtained by crosslinking a copolymer obtained by polymerizing or copolymerizing at least one monomer having a radical reactive functional group such as a vinyl group, a (meth)acryloyl group, an allyl group, a maleoyl group, a fumaroyl group, a styryl group, and a cinnamoyl group, with a crosslinkable monomer such as a polyamine-based compound.

It is preferable that the Si-containing resin is a copolymer obtained by crosslinking a copolymer formed of a radical reactive monomer having at least one kind of an epoxy group or an oxetane group, and a radical reactive monomer having at least one kind of a silyl group, with a crosslinkable monomer such as a polyamine-based compound. In addition, an epoxy group, an oxetane group, and a silyl group are collectively also referred to as non-radical reactive functional groups.

(1) Radical Reactive Monomer Having Epoxy Group or Oxetane Group

A radical reactive monomer having at least one kind of an epoxy group or an oxetane group has an epoxy group or an oxetane group, and a radical reactive functional group.

The radical reactive functional group is not particularly limited as long as it is an ethylenically unsaturated group that reacts in radical polymerization (vinyl group or vinyl group-containing functional group). Examples thereof include a vinyl group, a (meth)acryloyl group, an allyl group, a maleoyl group, a fumaroyl group, a styryl group, a cinnamoyl group, and the like. Inter alia, a vinyl group, a (meth)acryloyl group, and an allyl group, reactivity of which is easily controllable, are preferable.

The epoxy group or the oxetane group is a functional group that reacts with a compound having an amino group, a carboxy group, a chlorosulfone group, a mercapto group, a hydroxy group, an isocyanato group or the like to generate a polymer.

The reactive monomer having a radical reactive functional group and an epoxy group or an oxetane group is not particularly limited. Examples thereof include p-glycidylstyrene, glycidyl (meth)acrylate, 4-hydroxybutyl (meth)acrylate glycidyl ether, (3-ethyloxetan-3-yl)methyl (meth)acrylate, 3,4-epoxycyclohexylmethyl (meth)acrylate, and the like. Only one kind of these monomers may be used, or two or more kinds may be used concurrently.

(2) Radical Reactive Monomer Having Silyl Group

A radical reactive monomer having at least one kind of a silyl group has a silyl group and a radical reactive functional group.

The radical reactive functional group is not particularly limited as long as it is an ethylenically unsaturated group that reacts in radical polymerization. Examples thereof include a vinyl group, a (meth)acryloyl group, an allyl group, a maleoyl group, a fumaroyl group, a styryl group, a cinnamoyl group, and the like. Inter alia, a vinyl group, a (meth)acryloyl group, and an allyl group, reactivity of which is easily controllable, are preferable.

The reactive monomer having a silyl group and a radical reactive functional group is not particularly limited. Examples thereof include vinyltrichlorosilane, vinyltrimethoxysilane, vinyltriethoxysilane, p-styrylmethoxysilane, 3-methacryloxypropyldimethoxysilane, 3-methacryloxypropyltrimethoxysilane, 3-methacryloxypropylmethyldiethoxysilane, 3-methacryloxypropyltriethoxysilane, 8-methacryloxyoctyltriethoxysilane, 3-acryloxypropyltrimethoxysilane, and the like. Only one kind of these monomers may be used, or two or more kinds may be used concurrently.

(3) Copolymer Formed of Radical Reactive Monomer Having Epoxy Group or Oxetane Group and Radical Reactive Monomer Having Silyl Group In the above-mentioned copolymer, the ratio (mass ratio) between a component derived from a radical reactive monomer having an epoxy group or an oxetane group and a component derived from a radical reactive monomer having a silyl group is preferably 1:100 to 0.001. When the ratio of a component derived from a radical reactive monomer having a silyl group is less than 0.001, the strength of a shell is low and the hollow particles may collapse, or the hollow particles may not be obtained. When the ratio is greater than 100, a shell is too brittle, pinholes are easily generated, and accordingly it may be difficult to enhance the heat insulating properties of a film. The ratio can be 1:100, 70, 50, 30, 10, 5, 3, 1, 0.05, 0.01, 0.005 or 0.001. A more preferable ratio is 1:10 to 0.001, and a further preferable ratio is 1:1 to 0.01.

(4) Monofunctional Monomer (Other Monomers)

A polymer including the radical reactive monomer having an epoxy group or an oxetane group may contain a component derived from a monofunctional monomer having only one reactive functional group. Examples of the monofunctional monomer include styrene, an ester of (meth)acrylic acid and an alcohol having 1 to 25 carbon atoms, and the like.

Examples of the ester of (meth)acrylic acid and an alcohol having 1 to 25 carbon atoms include methyl (meth)acrylate, ethyl (meth)acrylate, propyl (meth)acrylate, n-butyl (meth)acrylate, isobutyl (meth)acrylate, tertiary butyl (meth)acrylate, pentyl (meth)acrylate, (cyclo)hexyl (meth)acrylate, heptyl (meth)acrylate, (iso)octyl (meth)acrylate, nonyl (meth)acrylate, (iso)decyl (meth)acrylate, norbornyl (meth)acrylate, isobornyl (meth)acrylate, adamantyl (meth)acrylate, lauryl (meth)acrylate, tetradecyl (meth)acrylate, (iso)stearyl (meth)acrylate, phenoxyethylene glycol (meth)acrylate, phenoxydiethylene glycol (meth)acrylate, 2-ethylhexyl (meth)acrylate, and the like.

Only one kind of the monofunctional polymer may be used, or two or more kinds of the monofunctional monomers may be used concurrently.

It is preferable that the content of the component derived from a radical reactive monomer having an epoxy group or an oxetane group and the component derived from a radical reactive monomer having a silyl group is 10% by mass or more of the whole components derived from the reactive monomers. When the content is less than 10% by mass, the hollow particles may not be formed. The content can be 10% by mass, 20% by mass, 30% by mass, 40% by mass, 50% by mass, 60% by mass or 70% by mass. The content of the component derived from a radical reactive monomer having an epoxy group or an oxetane group and the component derived from a radical reactive monomer having a silyl group is more preferably 30% by mass or more, and further preferably 50% by mass or more.

(5) Crosslinkable Monomer

The vinyl-based resin may contain a component derived from a crosslinkable monomer such as a polyamine-based compound.

Examples of the polyamine-based compound include ethylenediamine and an adduct thereof, diethylenetriamine, dipropylenetriamine, triethylenetetramine, tetraethylenepentamine, dimethylaminopropylamine, diethylaminopropylamine, dibutylaminopropylamine, hexamethylenediamine and a modified product thereof.

N-aminoethylpiperazine, bis-aminopropylpiperazine, trimethythexamethylenediamine, bis-hexamethylenetriamine, dicyandiamide, diacetoacrylamide, various modified aliphatic polyamines, aliphatic amines such as polyoxypropylenediamine, alicyclic amines such as 3,3'-dimethyl-4,4'-diaminodicyclohexylmethane, 3-amino-1-cyclohexylaminopropane, 4,4'-diaminodicyclohexylmethane, isophoronediamine, 1,3-bis(aminomethyl)cyclohexane, N-dimethylcyclohexylamine, and bis(aminomethyl)norbornane, and modified products thereof.

aromatic amines such as 4,4'-diaminodiphenylmethane (methylenedianiline), 4,4'-diaminodiphenyl ether, diaminodiphenyl sulfone, m-phenylenediamine, 2,4'-toluylenediamine, m-toluylenediamine, o-toluylenediamine, metaxylylenediamine, and xylylenediamine, and modified products thereof, and other special amine-modified products.

amidoamine, polyamidoamines such as an aminopolyamide resin, tertiary amines such as dimethylaminomethylphenol, 2,4,6-tri(dimethylaminomethyl)phenol, and a tri-2-ethylhexane salt of tri(dimethylaminomethyl)phenol, and the like.

Only one kind of the above-mentioned crosslinkable monomer may be used, or two or more kinds thereof may be used concurrently.

(6) Surface Treating Agent

The hollow particles may have a surface that has been treated with a compound having at least one anionic group. The surface treated with the compound imparts, to the hollow particles, heat resistance, dispersibility in an organic solvent, and a property that a low-molecular binder component hardly enters a hollow internal part.

The compound having an anionic group is selected from hydrochloric acid, an organic diacid anhydride, and an oxo acid (for example, inorganic acids such as nitric acid, phosphoric acid, sulfuric acid, and carbonic acid, and organic acids such as a carboxylic acid compound, an alkyl ester compound of sulfuric acid, a sulfonic acid compound, a phosphoric acid ester compound, a phosphonic acid compound, and a phosphinic acid compound). Among these compounds, a compound containing a phosphorus atom and/or a sulfur atom as a constituent component is preferable.

The carboxylic acid compound is not particularly limited as long as it is a compound having a carboxy group. Examples thereof include linear carboxylic acids such as formic acid, acetic acid, propionic acid, butyric acid, valeric acid, hexanoic acid, heptanoic acid, octanoic acid, nonanoic acid, decanoic acid, dodecanoic acid, tetradecanoic acid, and stearic acid; branched carboxylic acids such as pivalic acid, 2,2-dimethylbutyric acid, 3,3-dimethylbutyric acid, 2,2-dimethylvaleric acid, 2,2-diethylbutyric acid, 3,3-diethylbutyric acid, 2-ethylhexanoic acid, 2-methylheptanoic acid, 4-methyloctanoic acid, and neodecanoic acid; cyclic carboxylic acids such as naplithenic acid and cyclohexanedicarboxylic acid; and the like. In order to effectively enhance the dispersibility in an organic solvent, among them, linear carboxylic acids and branched carboxylic acids having 4 to 20 carbon atoms, and the like are preferable.

As the carboxylic acid compound, carboxylic acids having a radical reactive functional group such as a vinyl group, a (meth)acryloyl group, an allyl group, a maleoyl group, a fumaroyl group, a styryl group, and a cinnamoyl group can also be used. Examples thereof include acrylic acid, methacrylic acid, 2-acryloyloxyethylsuccinic acid, 2-methacryloyloxyethylsuccinic acid, 2-acryloyloxyethylhexahydrophthalic acid, 2-methacryloyloxyethylhexahydrophthalic acid, 2-acryloyloxyethylphthalic acid, 2-methacryloyloxyethylphthalic acid, vinylbenzoic acid, and the like.

Examples of the alkyl ester compound of sulfuric acid include dodecylsulfuric acid and the like.

The sulfonic acid compound is not particularly limited as long as it is a compound containing a sulfo group. Examples thereof include p-toluenesulfonic acid, benzenesulfonic acid, dodecylbenzenesulfonic acid, methylsulfonic acid, ethylsulfonic acid, vinylsulfonic acid, allylsulfonic acid, methallylsulfonic acid, 2-acrylamido-2-methylpropanesulfonic acid, and the like.

The phosphoric acid ester compound is not particularly limited as long as it is an ester compound of phosphoric acid. For example, there are dodecylphosphoric acid, and polyoxyethylene alkyl ether phosphoric acid represented by the following general formula (a).

[Chemical formula 2]

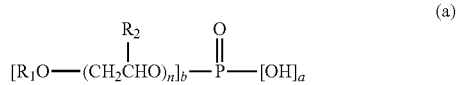

(a)

In the above-mentioned formula, $R_1$ is an alkyl group having 4 to 19 carbon atoms, an allyl group ($CH_2\!=\!CHCH_2\!-\!$), a (meth)acrylic group or a styryl group. Examples of the alkyl group having 4 to 19 carbon atoms include a butyl group, a pentyl group, an octyl group, a nonyl group, a decyl group, an undecyl group, a dodecyl group, a tridecyl group, and a stearyl group. These groups may be linear or branched. One kind of them may be used, or a plurality of kinds of them may be used concurrently.

$R_2$ is H or $CH_3$.

n is an addition mole number of alkylene oxide, and is a numerical value in a range necessary for giving an addition mole number of 0 to 30 based on 1 mole as a whole.

A combination of a and b is a combination of 1 and 2, or 2 and 1.

In addition, KAYAMER PM-21 of Nippon Kayaku Co., Ltd. and the like can be used.

As the oxo acid, a polymer having an acid group can also be used. Examples thereof include, but are not limited to, DISPERBYK 103, DISPERBYK 110, DISPERBYK 118, DISPERBYK 111, DISPERBYK 190, DISPERBYK 194N, and DISPERBYK 2015 (all manufactured by BYK-Chemie GmbH), Solsperse 3000, Solsperse 21000, Solsperse 26000, Solsperse 36000, Solsperse 36600, Solsperse 41000, Solsperse 41090, Solsperse 43000, Solsperse 44000, Solsperse 46000, Solsperse 47000, Solsperse 53095, and Solsperse 55000 (all manufactured by The Lubrizol Corporation), EFKA4401 and EFKA4550 (all manufactured by Efka Additives B.V.), Floren G-600, Floren G-700, Floren G-900, Floren GW-1500, and Floren GW-1640 (all manufactured by KYOEISHA CHEMICAL Co., LTD.), DISPARLON 1210, DISPARLON 1220, DISPARLON 2100, DISPARLON 2150, DISPARLON 2200, DISPARLON DA-325, and DISPARLON DA-375 (all manufactured by Kusumoto Chemicals, Ltd.), Adisper PB821, Adisper PB822, Adisper PB824, Adisper PB881, and Adisper PN411 (all manufactured by Ajinomoto Fine-Techno Co., Inc.), CYCLOMER P (ACA) Z200M, CYCLOMER P (ACA) Z230AA, CYCLOMER P (ACA) Z250, CYCLOMER P (ACA) Z251, CYCLOMER P (ACA) Z300, CYCLOMER P (ACA) Z320, and CYCLOMER P (ACA) Z254F (all manufactured by DAICEL-ALLNEX LTD.), ART CURE RA-3704MB, ART CURE RA-3953MP, ART CURE RA-4101, ART CURE MAP-4000, ART CURE MAP-2801, ART CURE RA-331MB, and ART CURE RA-341 (all manufactured by Negami Chemical Industrial Co., Ltd.), and the like.

Additionally, surface treatment may be performed with a silane-based coupling agent, a titanate-based coupling agent, an aluminate-based coupling agent, a zirconate-based coupling agent, an isocyanate-based compound or the like, as necessary.

Examples of the above-mentioned silane-based coupling agent include silane-based coupling agents such as alkoxysilanes such as methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, 1,6-bis(trimethoxysilyl)hexane, and trifluoropropyltrimethoxysilane; silazanes such as hexamethyldisilazane; chlorosilanes such as trimethylsilyl chloride; vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, p-styryltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, tris-(trimethoxysilylpropyl) isocyanurate, 3-ureidopropyltrialkoxysilane, 3-mercaptopropylmethyldimethoxysilane, 3-mercaptopropyltrimethoxysilane, bis(triethoxysilylpropyl) tetrasulfide, and 3-isocyanatopropyltriethoxysilane.

Examples also include a silane-based coupling agent represented by the following general formula (I), in addition to the above-mentioned silane-based coupling agents.

[Chemical formula 3]

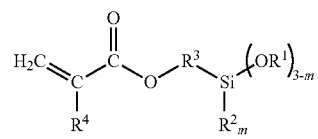

(I)

In the general formula (I), $R^1$s represent respectively independently a substituted or unsubstituted alkyl group having 1 to 6 carbon atoms, a substituted or unsubstituted alkoxyalkyl group having 2 to 4 carbon atoms, or a substituted or unsubstituted phenyl group.

$R^2$s represent respectively independently a substituted or unsubstituted alkyl group having 1 to 6 carbon atoms, a substituted or unsubstituted alkoxyalkyl group having 2 to 4 carbon atoms, or a substituted or unsubstituted phenyl group.

$R^3$ represents a divalent organic group having 1 to 30 carbon atoms.

$R^4$ represents a hydrogen atom or a methyl group.

m represents an integer of 0 to 2.

In $R^1$s and $R^2$s, examples of the alkyl group having 1 to 6 carbon atoms include methyl, ethyl, propyl, butyl, pentyl, and hexyl. These alkyl groups include structural isomers, if possible.

In $R^1$s and $R^2$s, examples of the alkoxyalkyl group having 2 to 4 carbon atoms include methoxymethyl, methoxyethyl, ethoxymethyl, methoxybutyl, ethoxyethyl, and butoxymethyl. These alkoxyalkyl groups include structural isomers, if possible.

Examples of a substituent of $R^1$s and $R^2$s include a halogen atom (a fluorine atom, a chlorine atom, a bromine atom, and an iodine atom), a hydroxy group, an amino group, a phenyl group, and the like.

In $R^3$, examples of the divalent organic group having 1 to 30 carbon atoms include alkanediyl groups such as methylene, ethylene, trimethylene, tetramethylene, pentamethylene, hexamethylene, heptamethylene, octamethylene, nonamethylene, decamethylene, undecamethylene, dodecamethylene, tridecamethylene, and tetradecamethylene. The alkanediyl group may have a branched structure substituted with an alkyl group.

Specific examples of the silane-based coupling agent represented by the general formula (I) include:

3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-(meth)acryloxybutyltrimethoxysilane, 4-(meth)acryloxybutyltriethoxysilane, 4-(meth)acryloxybutylmethyldimethoxysilane, 4-(meth)acryloxybutylmethyldiethoxysilane, 5-(meth)acryloxypentyltrimethoxysilane, 5-(meth)acryloxypentyltriethoxysilane, 5-(meth)acryloxypentylmethyldimethoxysilane, 5-(meth)acryloxypentylmethyldiethoxysilane, 6-(meth)acryloxyhexyltrimethoxysilane, 6-(meth)acryloxyhexyltriethoxysilane, 6-(meth)acryloxyhexylmethyldimethoxysilane, 6-(meth)acryloxyhexylmethyldiethoxysilane, 7-(meth)acryloxyheptyltrimethoxysilane, 7-(meth)acryloxyheptyltriethoxysilane, 7-(meth)acryloxyheptylmethyldimethoxysilane, 7-(meth)acryloxyheptylmethyldiethoxysilane, 8-(meth)acryloxyoctyltrimethoxysilane, 8-(meth)acryloxyoctyltriethoxysilane, 8-(meth)acryloxyoctylmethyldimethoxysilane, 8-(meth)acryloxyoctylmethyldiethoxysilane, 9-(meth)acryloxynonyltrimethoxysilane, 9-(meth)acryloxynonyltriethoxysilane, 9-(meth)acryloxynonylmethyldimethoxysilane, 9-(meth)acryloxynonylmethyldiethoxysilane, 10-(meth)acryloxydecyltrimethoxysilane, 10-(meth)acryloxydecyltriethoxysilane, 10-(meth)acryloxydecylmethyldimethoxysilane, 10-(meth)acryloxydecylmethyldiethoxysilane, 11-(meth)acryloxyundecyltrimethoxysilane, 11-(meth)acryloxyundecyltriethoxysilane, 11-(meth)acryloxyundecylmethyldimethoxysilane, 11-(meth)acryloxyundecylmethyldiethoxysilane, 12-(meth)acryloxydodecyltrimethoxysilane, 12-(meth)acryloxydodecyltriethoxysilane, 12-(meth)acryloxydodecylmethyldimethoxysilane, 12-(meth)acryloxydodecylmethyldiethoxysilane, 13-(meth)acryloxytridecyltrimethoxysilane, 13-(meth)acryloxytridecyltriethoxysilane, 13-(meth)acryloxytridecylmethyldimethoxysilane, 13-(meth)acryloxytridecylmethyldiethoxysilane, 14-(meth)acryloxytetradecyltrimethoxysilane, 14-(meth)acryloxytetradecyltriethoxysilane, 14-(meth)acryloxytetradecylmethyldimethoxysilane, 14-(meth)acryloxytetradecylmethyldiethoxysilane, and the like.

The silane-based coupling agent used in the present invention is not limited thereto. In addition, the silane-based coupling agent is available from one manufacturers such as Shin-Etsu Chemical Co., Ltd.

Among the above-mentioned silane-based coupling agents, 3-methacryloxypropylmethyldimethoxysilane, 3-methacryloxypropyltrimethoxysilane, 3-methacryloxypropylmethyldiethoxysilane, 3-methacryloxypropyltriethoxysilane, 8-methacryloxyoctyltriethoxysilane, and 3-acryloxypropyltrimethoxysilane are preferable.

Examples of the above-mentioned titanate-based coupling agent include PLENACT TTS, PLENACT 46B, PLENACT 55, PLENACT 41B, PLENACT 38S, PLENACT 138S, PLENACT 238S, PLENACT 338X, PLENACT 44, PLENACT 9SA, and PLENACT ET manufactured by Ajinomoto Fine-Techno Co., Inc., but the titanate-based coupling agent used in the present invention is not limited thereto.

Examples of the above-mentioned aluminate-based coupling agent include PLENACT AL-M manufactured by Ajinomoto Fine-Techno Co., Inc., but the aluminate-based coupling agent used in the present invention is not limited thereto.

Examples of the above-mentioned zirconate-based coupling agent include ORGATIX ZA-45, ORGATIX ZA-65, ORGATIX ZC-150, ORGATIX ZC-540, ORGATIX ZC-700, ORGATIX ZC-580, ORGATIX ZC-200, ORGATIX ZC-320, ORGATIX ZC-126, and ORGATIX ZC-300 manufactured by Matsumoto Fine Chemical Co., Ltd., but the zirconate-based coupling agent used in the present invention is not limited thereto.

Examples of the above-mentioned isocyanate-based compound include ethyl isocyanate, propyl isocyanate, isopropyl isocyanate, butyl isocyanate, tert-butyl isocyanate, hexyl isocyanate, dodecyl isocyanate, octadecyl isocyanate, cyclophenyl isocyanate, cyclohexyl isocyanate, benzyl isocyanate, phenyl isocyanate 4-butylphenyl isocyanate, 2-isocyanatoethyl methacrylate, 2-isocyanatoethyl acrylate, and 1,1-(bisacryloyloxymethyl)ethyl isocyanate, but the isocyanate-based compound used in the present invention is not limited thereto.

Only one kind of the above-mentioned surface treating agent may be used, or two or more kinds thereof may be used concurrently.

(7) Other Additives

The hollow particles may contain other additives such as pigment particles (pigment), a dye, a stabilizer, an ultraviolet absorbing agent, an anti-foaming agent, a thickener, a heat stabilizer, a leveling agent, a lubricant, and an antistatic agent, as necessary to such an extent that the effect of the present invention is not inhibited.

The pigment particles are not particularly limited as long as they are pigment particles used in the art. Examples thereof include particles of iron oxide-based pigments such as micaceous iron oxide and iron black; lead oxide-based pigments such as red lead and chrome yellow; titanium oxide-based pigments such as titanium white (rutile-type titanium oxide), titanium yellow, and titanium black; cobalt oxide; zinc oxide-based pigments such as zinc yellow; molybdenum oxide-based pigments such as molybdenum red and molybdenum white; and the like. Only one kind of the pigment particles may be used, or two or more kinds thereof may be used concurrently.

(8) Use of Hollow Particles

The hollow particles are useful as an additive of paint, paper, information recording paper, a heat-insulating film, and a thermoelectric conversion material, which are uses desired to be improved in the scratch resistance. Alternatively, the hollow particles are also useful as an additive of a coating agent (composition for coating) used in a light diffusion film (optical sheet), a light guide plate ink, an antireflection film, a light extraction film or the like, an additive of a master pellet for forming a molded article such as a light diffusion plate and a light guide plate, or an additive of cosmetics.

(a) Coating Agent

A coating agent contains at least the above-mentioned hollow particles. The coating agent may contain an arbitrary binder.

The binder is not particularly limited, and a known binder resin can be used. Examples of the binder resin include a thermosetting resin, a thermoplastic resin, and the like, more specifically, a fluorine-based resin, a polyamide resin, an acrylic resin, a polyurethane resin, an acrylic urethane resin, a butyral resin, and the like. These binder resins may be used alone, or may be used as a mixture of two or more kinds. Alternatively, the binder resin may be a homopolymer of one reactive monomer, or may be a copolymer of a plurality of monomers. As the binder, a reactive monomer may also be used.

Examples of the reactive monomer include monofunctional reactive monomers such as an ester of (meth)acrylic acid and an alcohol having 1 to 25 carbon atoms, such as methyl (meth)acrylate, ethyl (meth)acrylate, propyl (meth)acrylate, n-butyl (meth)acrylate, isobutyl (meth)acrylate, tertiary butyl (meth)acrylate, pentyl (meth)acrylate, (cyclo)hexyl (meth)acrylate, heptyl (meth)acrylate, (iso)octyl (meth)acrylate, nonyl (meth)acrylate, (iso)decyl (meth)acrylate, norbornyl (meth)acrylate, isobornyl (meth)acrylate, adamantyl (meth)acrylate, lauryl (meth)acrylate, tetradecyl (meth)acrylate, (iso)stearyl (meth)acrylate, phenoxyethylene glycol (meth)acrylate, phenoxydiethylene glycol (meth)acrylate, and 2-ethylhexyl (meth)acrylate; and polyfunctional reactive monomers such as trimethylolpropane tri(meth)acrylate, tripropylene glycol di(meth)acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate neopentyl glycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth)acrylate, and ditrimethylolpropane tetra(meth)acrylate.

When these reactive monomers are used, a polymerization initiator that initiates a curing reaction by ionizing radiation may be used. Examples thereof include an imidazole derivative, a bisimidazole derivative, an N-arylglycine derivative, an organic azide compound, titanocenes, an aluminate complex, an organic peroxide, an N-alkoxypyridinium salt, a thioxanthone derivative, and the like.

As the binder, for example, an inorganic binder such as a hydrolysate of a silicon alkoxide can also be used. Examples of the silicon alkoxide include tetramethoxysilane, tetraethoxysilane, methyltrimethoxysilane, methyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, vinyltrimethoxysilane, vinyltriethoxysilane, vinyltriacetoxysilane, allyltrimethoxysilane, 3-acryloxypropyltrimethoxysilane, 3-methacryloxypropylmethyldimethoxysilane, 3-methacryloxytrimethoxysilane, 3-methacryloxypropylmethyldiethoxysilane, 3-methacryloxypropyltriethoxysilane, 3-mercaptopropyltrimethoxysilane, 3-mercaptopropylmethyldimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane, 3-ureidopropyltriethoxysilane, dimethyldimethoxysilane, dimethyldiethoxysilane, diethyldimethoxysilane, and diethyldiethoxysilane.

Examples of known binder products include Dianal LR-102 and Dianal BR-106 manufactured by Mitsubishi Rayon Co., Ltd., and the like.

The content of the hollow particles in the coating agent appropriately adjusted depending on intended use, and the content of the used hollow particles can be in a range of 0.1 to 1,000 parts by mass based on 100 parts by mass of the binder.

A dispersion medium is usually contained in the coating agent. As the dispersion medium, either of aqueous and oily media can be used. Examples of the oily medium include hydrocarbon-based solvents such as toluene and xylene; ketone-based solvents such as methyl ethyl ketone and methyl isobutyl ketone; ester-based solvents such as ethyl acetate and butyl acetate; ether-based solvents such as dioxane, ethylene glycol diethyl ether, and 1-methoxy-2-propanol; and the like. Examples of the aqueous medium include water and alcohol-based solvents (for example, isopropyl alcohol). When an oily medium is used, it is preferable that the hollow particles which have been surface-treated with the above-mentioned silane-based coupling agent are used, from the viewpoint of improvement in the dispersibility. Furthermore, as the silane-based coupling agent, among the silane-based coupling agents represented by the above-mentioned general formula (I), a compound in which $R^3$ is a divalent organic group having a large number of carbon atoms is more preferable. For example, when a ketone-based solvent such as methyl isobutyl ketone is used as a medium, it is particularly preferable that 8-methacryloxyoctyltriethoxysilane is used.

Furthermore, the coating agent may contain other additives such as a curing agent, a coloring agent, an antistatic agent, and a leveling agent.

A substrate to be coated with the coating agent is not particularly limited, and a substrate suitable for the use can be used. For example, in an optical use, a transparent substrate such as a glass substrate and a transparent resin substrate is used.

(b) Master Pellet

A master pellet contains the hollow particles and a substrate resin.

The substrate resin is not particularly limited as long as it is a usual thermoplastic resin. Examples thereof include a (meth)acrylic resin, an alkyl (meth)acrylate-styrene copolymer resin, a polycarbonate resin, a polyester resin, a polyethylene resin, a polypropylene resin, a polystyrene resin, and the like. When the transparency is particularly requested, a (meth)acrylic resin, an alkyl (meth)acrylate-styrene copolymer resin, a polycarbonate resin, and a polyester resin are preferable. These substrate resins may be used alone, or may be used in combination of two or more kinds thereof. In addition, the substrate resin may contain an additive such as an ultraviolet absorbing agent, a heat stabilizer, a coloring agent, and a filler in a trace amount.

The master pellet can be produced by melt-kneading the hollow particles and the substrate resin, and then subjecting them to a molding method such as extrusion molding and injection molding. The blending rate of the hollow particles in the master pellet is not particularly limited, but is preferably about 0.1 to 60% by mass, more preferably about 0.3 to 30% by mass, further preferably about 0.4 to 10% by mass. When the blending rate exceeds 60% by mass, it may become difficult to produce the master pellet. When the blending rate is smaller than 0.1% by mass, the effect of the present invention may be deteriorated.

The master pellet turns into a molded article, for example, by extrusion molding, injection molding or press molding. The substrate resin may be newly added upon molding. The addition amount of the substrate resin is preferably decided so that the blending rate of the hollow particles contained in the finally obtained molded article is about 0.1 to 60% by mass. In addition, at the time of molding, for example, an additive such as an ultraviolet absorbing agent, a heat stabilizer, a coloring agent, and a filler may be added in a trace amount.

(c) Cosmetics

Examples of the specific cosmetics into which the hollow particles may be blended include solid cosmetics such as face powder and foundation; powdery cosmetics such as baby powder and body powder; liquid cosmetics such as skin lotion, milky lotion, cream, and body lotion; and the like.

The blending rate of the hollow particles into these cosmetics varies depending on the kind of cosmetics. For example, in the case of solid cosmetics such as face powder and foundation, the blending rate is preferably 1 to 20% by mass, and particularly preferably 3 to 15% by mass. In the case of powdery cosmetics such as baby powder and body powder, the blending rate is preferably 1 to 20% by mass, and particularly preferably 3 to 15% by mass. Furthermore, in the case of liquid cosmetics such as skin lotion, milky lotion, cream, liquid foundation, body lotion, and pre-shave lotion, the blending rate is preferably 1 to 15% by mass, and particularly preferably 3 to 10% by mass.

In order to improve the optical function or improve the touch feeling, inorganic compounds such as mica and talc, coloring pigments such as iron oxide, titanium oxide, ultramarine, Prussian blue, and carbon black, or synthetic dyes such as an azo-based dye can be added to these cosmetics. In the case of liquid cosmetics, a liquid medium is not particularly limited, and water, an alcohol, a hydrocarbon, a silicone oil, vegetable or animal fats and oils or the like can also be used. Various functions can be added to these cosmetics by adding a moisturizing agent, an anti-inflammatory agent, a whitening agent, a UV care agent, a bactericide, an antiperspirant, a refreshing agent, a perfume or the like, which is generally used in cosmetics, in addition to the above-mentioned other ingredients.

(d) Heat-Insulating Film

A heat-insulating film contains at least the above-mentioned hollow particles. Since a film or a sheet-like material containing the above-mentioned hollow particles has an air layer inside the hollow particles, it can be used as a heat-insulating film. Additionally, since the particle diameter of the above-mentioned hollow particles is small, a heat-insulating film having high transparency is obtained. Since a binder hardly enters a hollow part, a heat-insulating film having high heat-insulating properties is easily obtained. The above-mentioned heat-insulating film can be obtained by applying the above-mentioned coating agent, to a substrate by a well-known method such as a dipping method, a spraying method, a spin coating method, and a roll coating method, drying the coating agent, and if necessary, further heating the substrate, irradiating the substrate with ultraviolet rays, or firing the substrate.

(e) Antireflection Film

An antireflection film contains at least the above-mentioned hollow particles. Since a film or a sheet-like material containing the above-mentioned hollow particles is reduced in the refractive index due to an air layer inside the hollow particles, it can be used as an antireflection film. Additionally, since the above-mentioned hollow particles have high heat resistance, an antireflection film having high heat resistance is obtained. The above-mentioned antireflection film can be obtained by applying the above-mentioned coating agent to a substrate by a well-known method such as a dipping method, a spraying method, a spin coating method, a spinner method, and a roll coating method, drying the coating agent, and if necessary, further heating the substrate, irradiating the substrate with ultraviolet rays, or firing the substrate.

(f) Substrate With Antireflection Film

A substrate with an antireflection film is a substrate in which the above-mentioned antireflection film is formed on a surface of glass, a plastic sheet of polycarbonate, an acrylic resin, PET, TAC or the like, a substrate of a plastic film, a plastic lens, a plastic panel or the like, or a substrate of a cathode ray tube, a fluorescent display tube, a liquid crystal display panel or the like. Although different depending on use, a coating film is formed alone, or a coating film is formed on a substrate in combination with a protective film, a hard coat film, a flattening film, a high refractive index film, an insulating film, an electrically conductive resin film, an electrically conductive metal fine particle film, an electrically conductive metal oxide fine particle film, a primer film that is used as necessary, or the like. When the coating film is used in combination, the antireflection film does not necessarily have to be formed on the outermost surface.

(g) Light Extraction Film

A light extraction film contains at least the above-mentioned hollow particles. In LED or organic EL illumination, since there is a great difference in the refractive index between an air layer and a light emitting layer, emitted light is easily confined inside an element. For that reason, the light extraction film is used for the purpose of improving the luminous efficacy. Since a film or a sheet-like material containing the above-mentioned hollow particles is reduced in the refractive index due to an air layer inside the hollow particles, it can be used as the light extraction film. Additionally, since the above-mentioned hollow particles have high heat resistance, a light extraction film having high heat resistance is obtained. The above-mentioned light extraction film can be obtained by applying the above-mentioned coating agent to a substrate by a well-known method such as a dipping method, a spraying method, a spin coating method, a spinner method, and a roll coating method, drying the coating agent, and if necessary, further heating the substrate, irradiating the substrate with ultraviolet rays, or firing the substrate.

(h) Substrate With Light Extraction Film

A substrate with a light extraction film is a substrate in which the above-mentioned light extraction film is formed on a surface of glass, a plastic sheet of polycarbonate, an acrylic resin, PET, TAC or the like, a substrate of a plastic film, a plastic lens, a plastic panel or the like, or a substrate of a cathode ray tube, a fluorescent display tube, a liquid crystal display panel or the like. Although different depending on use, a coating film is formed alone, or a coating film is formed on a substrate in combination with a protective film, a hard coat film, a flattening film, a high refractive index film, an insulating film, an electronically conductive resin film, an electrically conductive metal fine particle film, an electrically conductive metal oxide fine particle film, or a primer film that is used as necessary, or the like. When the coating film is used in combination, the light extraction film does not necessarily have to be formed on the outermost surface.

(i) Laminate

A laminate is formed of at least a substrate, and a cured resin layer containing the above-mentioned hollow particles. Since the laminate has an air layer inside the hollow particles, it can be used as a heat-insulating film or an antireflection film.

The laminate can be obtained by applying the above-mentioned coating agent to a substrate by a well-known method such as a dipping method, a spraying method, a spin coating method, a spinner method, and a roll coating method, drying the coating agent, and if necessary, further heating the substrate, irradiating the substrate with ultraviolet rays, or firing the substrate. For the substrate, any of those exemplified in the above-mentioned (a) to (h) can be used.

It is preferable that when subjected to the bend test (cylindrical mandrel method) described in JIS K5600-5-1: 1999, the cured resin layer has such a bending resistance that the cured resin layer begins to crack at a mandrel diameter of 8 mm or less. The mandrel diameter at which the cured resin layer begins to crack is more preferably 6 mm or less.

In order to use the laminate as a heat-insulating film or an antireflection film, it is necessary to incorporate a relatively large amount of the hollow particles in the laminate. When a large amount of commercially available hollow particles of an inorganic composition are added to the cured resin layer, a coating film has too high rigidity. Therefore, the bending property is reduced, and when the coating film is stuck to a curved surface, or in punching processing, the coating film is easily cracked. However, since the above-mentioned hollow particles have an organic composition, even when added to the cured resin layer in a large amount, a coating film does not have too high rigidity, and a laminate having a high bending property is easily obtained. The addition amount of the hollow particles to the cured resin layer varies depending on the required heat insulating properties or antireflection properties, and is preferably 10 to 70% by weight.

The cured resin layer preferably has a thickness of 0.05 to 10 µm, and more preferably, has a thickness of 0.05 to 3 µm. It is preferable that the substrate has a thickness of 1 to 300 µm.

(9) Method of Producing Hollow Particles

The hollow particles can be produced, for example, by undergoing a step of preparing polymer particles containing a non-reactive solvent (polymerization step), a step of phase-separating the non-reactive solvent from the polymer particles (phase separation step), and a step of removing the non-reactive solvent (solvent removal step), without particular limitation.

In a conventional method of producing hollow particles, a shell is formed by polymerizing a reactive monomer once, and phase separation between an organic solvent (non-reactive solvent) and the shell is performed simultaneously with polymerization. The inventors of the present invention thought that, in this method, the step of simultaneously performing phase separation and polymerization causes generation of pinholes and reduction in the monodispersibility. The inventors also thought that pinholes of the shell inhibit reduction in the heat conductivity of a film and reduction in the reflectance of a film when the hollow particles are used as a heat conductivity adjusting agent. Then, the inventors thought that by forming polymer particles once before phase separation of the non-reactive solvent, and then causing phase separation, generation of pinholes can be suppressed and the monodispersibility can be improved.

Specifically, polymer particles are prepared by polymerizing a reactive monomer having a radical reactive functional group and a non-radical reactive functional group based on either one of both the functional groups. The non-reactive solvent is incorporated into the polymer particles by mixing with the reactive monomer in advance, or making the polymer particles absorb the non-reactive solvent after preparation of the polymer particles. Then, the polymer and the non-reactive solvent are phase-separated by polymerization of the remaining other functional group of both the functional groups to give microcapsule particles enclosing the non-reactive solvent. Then, hollow particles are obtained by removing the non-reactive solvent.

In the foregoing, separation of polymerization and phase-separation has the following advantages.

Gaps between polymers of the shell, which exist in the conventional production method, do not exist, and generation of pinholes in the shell of the resulting hollow particles can be suppressed.

Since the shape of the hollow particles does not depend on oil droplets, but depends on the shape and the particle size distribution of polymer particles before phase separation, hollow particles having high monodispersibility are easily obtained. The production method will be described below.

(A) Polymerization Step

In a polymerization step, polymer particles are prepared polymerizing a reactive monomer having a radical reactive functional group and a non-radical reactive functional group based on either one of both the functional groups. A non-reactive solvent is incorporated into the polymer particles by mixing with the reactive monomer in advance, or making the polymer particles absorb the non-reactive solvent after preparation of the polymer particles.

(a) Method of Preparing Polymer Particles

As a method of preparing polymer particles, an arbitrary method can be adopted among known methods such as a mass polymerization method, a solution polymerization method, a dispersion polymerization method, a suspension polymerization method, and an emulsion polymerization method. Among them, a suspension polymerization method and an emulsion polymerization method by which polymer particles can be relatively simply prepared are preferable. Furthermore, an emulsion polymerization method by which polymer particles having high monodispersibility are easily obtained is more preferable.

Polymer particles are obtained by polymerizing the radical reactive functional group or the non-radical reactive functional group.

It is preferable that polymerization is performed by adding a compound that polymerizes a functional group to be polymerized.

(i) When the radical reactive functional group is polymerized, a polymerization initiator can be used for the compound. The polymerization initiator is not particularly limited, and examples thereof include persulfates such as ammonium persulfate, potassium persulfate, and sodium persulfate; organic peroxides such as cumene hydroperoxide, di-tert-butyl peroxide, dicumyl peroxide, benzoyl peroxide, lauroyl peroxide, dimethylbis(tert-butylperoxy) hexane, dimethylbis(tert-butylperoxy)hexyne-3, bis(tert-butylperoxyisopropyl)benzene, bis(tert-butylperoxy) trimethylcyclohexane, butyl-bis(tert-butylperoxy)valerate, 2-ethylhexaneperoxy acid tert-butyrate, dibenzoyl peroxide, paramenthane hydroperoxide, and tert-butylperoxy benzoate; azo compounds such as 2,2'-azobis[2-(2-imidazolin-2-yl)propane]dihydrochloride, 2,2'-azobis[2-(2-imidazolin-2-yl)propane]disulfate dihydrate, 2,2'-azobis(2-amidinopropane) dihydrochloride, 2,2'-azobis[N-(2-carboxyethyl)-2-methylpropionamidine]hydrate, 2,2'-azobis{2-[1-(2-hydroxyethyl)-2-imidazolin-2-yl] propane}dihydrochloride, 2,2'-azobis[2-(2-imidazolin-2-yl) propane], 2,2'-azobis(1-imino-1-pyrrolidino-2-ethylpropane) dihydrochloride, 2,2'-azobis{2-methyl-N-[1, 1-bis(hydroxymethyl)-2-hydroxyethyl]propionamide}, 2,2'-azobis[2-methyl-N-(2-hydroxyethyl)propionamide], 4,4'-azobis(4-cyanopentanoic acid), 2,2'-azobisisobutyronitrile, (2,2'-azobis(2-methyl-butyronitrile)), 2,2'-azobis(2-isopropylbutyronitrile), 2,2'-azobis(2,3-dimethylbutyronitrile), 2,2'-azobis(2,4-dimethylbutyronitrile), 2,2'-azobis(2-methylcapronitrile), 2,2'-azobis(2,3,3-trimethylbutyronitrile), 2,2'-azobis(2,4,4-trimethylvaleronitrile), 2,2'-azobis(2,4-dimethylvaleronitrile), 2,2'-azobis(2,4-dimethyl-4-ethoxyvaleronitrile), 2,2'-azobis(2,4-dimethyl-4-n-butoxyvaleronitrile), 2,2'-azobis(4-methoxy-2,4-dimethylvaleronitrile), 2,2'-azobis[N-(2-propenyl)-2-methylpropionamide], 2,2'-azobis(N-butyl-2-methylpropionamide), 2,2'-azobis(N-cyclohexyl-2-methylpropionamide), 1,1'-azobis(1-acetoxy-1-phenylethane), 1,1'-azobis(cyclohexane-1-carbonitrile), dimethyl-2,2'-azobis(2-methylpropionate), dimethyl-2,2'-azobisisobutyrate, dimethyl-2,2'-azobis(2-methylpropionate), 2-(carbamoylazo)isobutyronitrile, and 4,4'-azobis(4-cyanovaleric acid). Only one kind of the polymerization initiator may be used, or two or more kinds thereof may be used concurrently.

Alternatively, a redox-based initiator containing a combination of a polymerization initiator such as the above-mentioned persulfates and organic peroxides, with a reducing agent such as sodium sulfoxylate formaldehyde, sodium hydrogen sulfite, ammonium hydrogen sulfite, sodium thiosulfate, ammonium thiosulfate, hydrogen peroxide, sodium hydroxymethanesulfinate, L-ascorbic acid and a salt thereof, a cuprous salt, and a ferrous salt may be used as the polymerization initiator.

When the polymerization is emulsion polymerization, it is preferable that the polymerization initiator is a water-soluble polymerization initiator by which emulsion polymerization can be performed with a water solvent. The water-soluble polymerization initiator is not particularly limited, and examples thereof include persulfates such as ammonium persulfate, potassium persulfate, and sodium persulfate; and azo compounds such as 2,2'-azobis[2-(2-imidazolin-2-yl)propane]dihydrochloride, 2,2'-azobis[2-(2-imidazolin-2-yl)propane]disulfate dihydrate, 2,2'-azobis(2-amidinopropane) dihydrochloride, 2,2'-azobis[N-(2-carboxyethyl)-2-methyl-propionamidine]hydrate, 2,2'-azobis{2-[1-(2-hydroxy-ethyl)-2-imidazolin-2-yl]propane}dihydrochloride, 2,2'-azobis[2-(2-imidazolin-2-yl)propane], 2,2'-azobis(1-imino-1-pyrrolidino-2-ethylpropane) dihydrochloride, 2,2'-azobis{2-methyl-N-[1,1-bis(hydroxmethyl)-2-hydroxyethyl]propionamide}, 2,2'-azobis[2-methyl-N-(2-hydroxyethyl)propionamide], 4,4'-azobis(4-cyanopentanoic acid).

(ii) It is preferable that polymer particles have an unreacted non-radical reactive functional group in the polymer by polymerizing a radical reactive functional group first. When a non-radical reactive functional group is polymerized first, a non-reactive solvent may be hardly absorbed.

It is preferable that one reactive functional group of a radical reactive functional group and a non-radical reactive functional group is polymerized so that polymer particles have the other reactive functional group that is unreacted in the polymer. However, even if a functional group to be polymerized at the time of production of polymer particles is not totally polymerized but is partially polymerized, there is no great problem. Moreover, if the other reactive functional group is partially polymerized, there is no great problem. For example, when a radical reactive functional group of glycidyl methacrylate is polymerized to prepare polymer particles having an epoxy group, an unreacted radical reactive functional group may remain, or an epoxy group may be partially ring opened (in other words, it is enough that only an epoxy group in an amount capable of phase separation remains in polymer particles).

An upper limit of the amount of a used chain transfer agent is 50 parts by mass based on 100 parts by mass of the reactive monomer.

(iii) A chain transfer agent may be used at the time of polymerization of the reactive monomer. The chain transfer agent is not particularly limited, and examples thereof include alkylmercaptans such as n-hexylmercaptan, n-octylmercaptan, t-octylmercaptan, n-dodecylmercaptan, and t-dodecylmercaptan; an α-methylstyrene dimer; phenol-based compounds such as 2,6-di-t-butyl-4-methylphenol and styrenated phenol; allyl compounds such as allyl alcohol; and halogenated hydrocarbon compounds such as dichloromethane, dibromomethane and carbon tetrachloride. Only one kind of the chain transfer agent may be used, or two or more kinds thereof may be used concurrently.

(b) Absorption of Non-Reactive Solvent

A non-reactive solvent can be absorbed into polymer particles at the time of production of the polymer particles or after production of the polymer particles. The non-reactive solvent can be absorbed in the presence or absence of a dispersion medium that is non-compatible with the non-reactive solvent. Absorbing the non-reactive solvent in the presence of a dispersion medium is preferable since the non-reactive solvent can be efficiently absorbed. When a medium is used in a method of producing polymer particles, the medium may be used as a dispersion medium as it is, or may be dispersed in a dispersion medium after polymer particles are isolated from the medium once.

The non-reactive solvent can be absorbed into the polymer particles by adding the non-reactive solvent that is non-compatible with a dispersion medium to a dispersion medium containing polymer particles, and performing stirring or the like for a given time.

Additionally, absorption of the non-reactive solvent at the time of production of polymer particles can be realized by selecting a dispersion medium and a non-reactive solvent suitable for preparing polymer particles. For example, when polymer particles are prepared by emulsion polymerization with a water-soluble medium, a non-reactive solvent that is non-compatible with water is added to a water solvent in advance, and a reactive monomer is polymerized, so that preparation of polymer particles and absorption of the polymer particles can be performed simultaneously. When preparation of the polymer particles and absorption of the polymer particles are simultaneously performed, the time necessary for absorption of the non-reactive solvent can be reduced.

(i) Dispersion Medium

The dispersion medium is not particularly limited as long as it is a liquid substance that does not completely dissolve polymer particles. Examples thereof include water; alcohols such as ethyl alcohol, methyl alcohol, and isopropyl alcohol; alkanes such as butane, pentane, hexane, cyclohexane, heptane, decane, and hexadecane; aromatic hydrocarbons such as toluene and xylene; ester-based solvents such as ethyl acetate and butyl acetate; ketone-based solvents such as methyl ethyl ketone and methyl isobutyl ketone; and halogen-based solvents such as methyl chloride, methylene chloride, chloroform, and carbon tetrachloride. Only one kind of them may be used, or two or more kinds thereof may be used concurrently.

(ii) Non-Reactive Solvent

The non-reactive solvent is not particularly limited as long as it is a liquid substance that is non-compatible with a dispersion medium. Herein, "non-compatible with a dispersion medium" means that the solubility of the non-reactive solvent in the dispersion medium (at 25° C.) is 10% by mass or less. For example, when water is used as the dispersion medium, examples of a usable non-reactive solvent include butane, pentane, hexane, cyclohexane, heptane, decane, hexadecane, toluene, xylene, ethyl acetate, butyl acetate, methyl ethyl ketone, methyl isobutyl ketone, 1,4-dioxane, methyl chloride, methylene chloride, chloroform, carbon tetrachloride, and the like. Only one kind of them may be used, or two or more kinds thereof may be used concurrently.

The addition amount of the non-reactive solvent is not particularly limited, but is 20 to 5,000 parts by mass based on 100 parts by mass of the polymer particles. When the addition amount is less than 20 parts by mass, a hollow part of the resulting hollow particles is small, and a desired property may not be obtained. When the addition amount exceeds 5,000 parts by mass, a hollow part becomes too large and the strength of the resulting hollow particles may be reduced.

(B) Phase Separation Step

Next, the remaining reactive functional group is polymerized to phase-separate the polymer from the non-reactive solvent. By phase separation, microcapsule particles enclosing the non-reactive solvent are obtained. In the present invention, "hollow" of the hollow particles is intended to mean not only the case where air exists in a hollow part, but also microcapsule particles in which the non-reactive solvent and other dispersion media exist in the hollow part.

As a compound that is added in order to polymerize the remaining reactive functional group, the same compounds as the polymerization initiator for polymerizing the radical reactive functional group and the crosslinking agent for polymerizing the non-radical reactive functional group described in the above-mentioned polymerization step can be used.

(C) Solvent Removal (Replacement) Step

As hollow particles, hollow particles in which air or other solvents exist in a hollow part can be obtained by removing or replacing the non-reactive solvent enclosed in microcapsule particles, as necessary. A method of removing the non-reactive solvent is not particularly limited, and examples thereof include a reduced-pressure drying method and the like. Examples of conditions for the reduced-pressure drying method include a pressure of 500 Pa or lower, 30 to 200° C., and 30 minutes to 50 hours. Alternatively, the non-reactive solvent can be replaced by a solvent replacement operation. For example, as for microcapsule particles enclosing the non-reactive solvent, the non-reactive solvent inside the particles is replaced with a dispersion medium by adding an appropriate dispersion medium to the microcapsule particles enclosing the non-reactive solvent, or a dispersion liquid thereof, and performing stirring or the like. Then, the non-reactive solvent can be replaced by removing the extra non-reactive solvent and dispersion medium by a reduced-pressure drying method, a centrifugation method, an ultrafiltration method or the like. Solvent replacement may be performed only once, or may be performed a plurality of times.

The hollow particles may be used as a dispersion liquid of the hollow particles in a solvent, as necessary. For example, the hollow particles may be used in the state of a dispersion liquid of microcapsule particles enclosing the non-reactive solvent, which is obtained after a phase separation step, or may be used as a dispersion liquid in a solvent replaced with another dispersion solvent.

The hollow particles may be used as dry powder obtained by drying a dispersion liquid of the hollow particles in a solvent, as necessary. A method of drying the hollow particles is not particularly limited, and examples thereof include a reduced-pressure drying method and the like. In addition, a dispersion solvent, a non-reactive solvent or the like that remains without being dried may remain in the dry powder.

(D) Other Steps

A surface of the hollow particles can be treated with a compound having an anionic group by adding the compound having an anionic group to the dispersion liquid of hollow particles after the phase separation step and stirring the mixture, or adding the compound having an anionic group to hollow particles after the solvent removal step and mixing the materials. Inter alia, it is preferable that an extra crosslinking agent is removed after the phase separation step, and then the compound having an anionic group is added to the dispersion liquid of the hollow particles and the mixture is stirred. Examples of treatment conditions include 30 to 200° C. and 30 minutes to 50 hours.

EXAMPLES

The present invention will be further specifically described below by way of examples, but the present invention is not limited to these examples at all. First, details of various measuring methods used in examples will be described below.

(Average Particle Diameter, Hollow Ratio)

The average particle diameter and a hollow ratio hollow particles were measured as follows.

That is, a 10 mass % dispersion liquid of surface-treated hollow particles in isopropyl alcohol or a 10 mass % dispersion liquid of surface-treated hollow particles in methyl isobutyl ketone was dried with a vacuum dryer (pressure: 100 kPa or lower) at 70° C. for 4 hours to obtain dry powder. A TEM photograph of the hollow particles was taken at a magnification of about 30,000 under conditions of an acceleration voltage of 80 kV using a transmission electron microscope (H-7600 manufactured by Hitachi High-Technologies Corporation). At this time, particles were confirmed more clearly by using ruthenium tetroxide staining or the like. The particle diameter and the inner diameter of arbitrary 100 or more particles taken in the photograph were observed. At this time, the average particle diameter and the average inner diameter were obtained by measuring the particle diameter and the inner diameter at five or more places so that the diameters pass through the center of each particle, and averaging the resulting values. Furthermore, the hollow ratio of the hollow particles was obtained by the expression of (average inner diameter)$^3$/(average particle diameter)$^3 \times 100$.

(Dispersed Particle Diameter)

The dispersed particle diameter of hollow particles in an organic solvent was measured as follows.

That is, a 10 mass % dispersion liquid of hollow particles in isopropyl alcohol or a 10 mass % dispersion liquid of hollow particles in methyl isobutyl ketone was diluted with isopropyl alcohol or methyl isobutyl ketone, a dispersion liquid prepared to be about 0.1% by mass was irradiated with laser light, the intensity of scattered light scattered from the hollow particles dispersed in isopropyl alcohol or methyl isobutyl ketone was measured by temporary changes in microsecond unit. The detected scattering intensity distribution derived from the hollow particles was fitted to the normal distribution, and a Z average particle diameter of the hollow particles was obtained by a cumulant analysis method for calculating the average particle diameter. The Z average particle diameter was used as the dispersed particle diameter in an organic solvent. The Z average particle diameter was simply measured with a commercially available particle diameter measuring apparatus. In the following examples and comparative examples, the Z average particle diameter was measured using a particle diameter measuring apparatus (product name "Zetasizer Nano ZS") of Malvern Instruments Ltd.

(Phosphorus Atom Amount, Sulfur Atom Amount, Silicon Atom Amount)

The phosphorus atom amount and the sulfur atom amount of hollow particles were measured as follows.

That is, a 10 mass % dispersion liquid of surface-treated hollow particles in isopropyl alcohol or a 10 mass % dispersion liquid of surface-treated hollow particles in methyl isobutyl ketone was dried with a vacuum dryer (pressure: 100 kPa or lower) at 70° C. for 4 hours to obtain dry powder. By order analysis (FP bulk method) using a fluorescent X-ray analyzer RIX-2100 (manufactured by Rigaku Corporation), the phosphorus atom amount and the sulfur atom amount were measured. That is, an electrically conductive carbon double-sided tape (manufactured by Nisshin EM Co., Ltd.) was stuck to a sample stand made of carbon (manufactured by Nisshin EM Co., Ltd.), 11 mg of a sample was weighed on the stuck electrically conductive carbon double-sided tape, the sample was adjusted so as not to expand to 10 mmφ or more, the sample was covered with a PP film, and the sample was set in a 10 mmφ sample case attached to the apparatus to obtain a measurement sample. P, S, and Si were measured under the following conditions, and amounts of contained atoms were obtained by the order analysis method.

<Apparatus Conditions>
Apparatus: RIX-2100 (manufactured by Rigaku Corporation)
X-ray tube target: Rh
Analysis method: Order analysis FP bulk method
Measurement diameter: 10 mm
Spin: Yes
Atmosphere: Vac
Sample form: Metal
Balance component: $C_7H_{10}O_3$
Sample protective film correction: Yes (PP Film)
Smoothing: 11 points
Flux component, dilution rate, removal of impurities: No
<Measurement Conditions for P>
P-Kα
Tube: Rh (30 KV-100 mA)
Primary filter: OUT
Attenuator: 1/1
Slit: Std.
Dispersive crystal: GE
Detector: PC
PHA LL: 150 UL: 300
2θ: 141.180 deg (measurement range: 137 to 144 deg)
Step: 0.05 deg
Measurement time: 0.4 sec
<Measurement Conditions for S>
S-Kα
Tube: Rh (30 KV-100 mA)
Primary filter: OUT
Attenuator: 1/1
Slit: Std.
Dispersive crystal: GE
Detector: PC
PHA LL: 150 UL: 300
2θ: 110.820 deg (measurement range: 107 to 114 deg)
Step: 0.05 deg
Measurement time: 0.4 sec
<Measurement Conditions for Si>
S-Kα
Tube: Rh (30 KV-100 mA)
Primary filter: OUT
Attenuator: 1/1
Slit: Std.
Dispersive crystal: PET
Detector: PC
PHA LL: 100 UL: 300
2θ: 109.040 deg (measurement range: 106 to 112 deg)
Step: 0.05 deg
Measurement time: 0.4 sec (Absorbance Ratio α: Reactive Group Introduction Amount)

The absorbance ratio α; reactive group introduction amount of hollow particles was measured as follows.

That is, a 10 mass % dispersion liquid of surface-treated hollow particles in isopropyl alcohol or a 10 mass % dispersion liquid of surface-treated hollow particles in methyl isobutyl ketone was dried with a vacuum dryer (pressure: 100 kPa or lower) at 70° C. for 4 hours to obtain dry powder. The dry powder was subjected to infrared spectroscopic ATR measurement under the following conditions to obtain an infrared absorption spectrum. From the resulting infrared absorption spectrum, the absorbance ratio α (A810/A1720; reactive group introduction amount) between absorbance at 810 $cm^{-1}$ (A810) and absorbance at 1720 $cm^{-1}$ (A1720) was obtained.

Absorbances A810 and A1720 were measured by connecting "Smart-iTR" manufactured by Thermo Fisher Scientific K.K. as an ATR accessory to a measuring apparatus sold from Thermo Fisher Scientific K.K. under product name "Fourier Transform Infrared Spectrometer Nicolet iS10", Infrared spectroscopic ATR measurement was performed under the following conditions.

<Measurement Conditions>
Measuring apparatus: Fourier Transform Infrared Spectrometer Nicolet iS10 (manufactured by Thermo Fisher Scientific K.K.) and single reflection horizontal ATR Smart-iTR (manufactured by Thermo Fisher Scientific K.K.)
ATR crystal: Diamond with ZnSe lens, angle=42°
Measuring method: Single ATR method
Measurement wavenumber region: 4,000 $cm^{-1}$ to 650 $cm^{-1}$
Wavenumber dependence of measurement depth: Not corrected
Detector: Deuterated triglycine sulfate (DTGS) detector and KBr beam splitter, Resolution: 4 $cm^{-1}$
Integration time: 16 times (the same in the background measurement)

Since the intensity of an infrared absorption spectrum obtained by measurement varies depending on the extent of adherence between a sample and a high refractive index crystal in the ATR method, measurement was performed by applying the maximum load that can be applied by "Smart-iTR" of the ATR accessory to approximately uniformize the extent of adherence.

The infrared absorption spectra obtained under the above-mentioned conditions were subjected to peak treatment as described below to obtain A810 and A1720 of each sample.

Absorbance A810 at 810 $cm^{-1}$ obtained from an infrared absorption spectrum was absorbance corresponding to an absorption spectrum derived from out-of-plane bending vibration of a vinyl group CH. In measurement of the absorbance, even when another absorption spectrum overlapped at 810 $cm^{-1}$, peak separation was not performed. Absorbance A810 meant the maximum absorbance between 820 $cm^{-1}$ and 800 $cm^{-1}$, with a straight line connecting 825 $cm^{-1}$ and 795 $cm^{-1}$ being a base line.

Absorbance A1720 at 1720 $cm^{-1}$ was absorbance corresponding to an absorption spectrum derived from C=O stretching vibration of a carbonyl group. In measurement of the absorbance, even when another absorption spectrum overlapped at 1720 $cm^{-1}$, peak separation was not performed. Absorbance A1720 meant the maximum absorbance between 1740 $cm^{-1}$ and 1700 $cm^{-1}$, with a straight line connecting 1820 $cm^{-1}$ and 1540 $cm^{-1}$ being a base line.

(Scratch Resistance)

The scratch resistance of a cured article containing hollow particles was evaluated as follows.

That is, 30 parts by mass of a 10 mass % dispersion liquid of surface-treated hollow particles in isopropyl alcohol or a 10 mass % dispersion liquid of surface-treated hollow particles in methyl isobutyl ketone, 6.6 parts by mass of dipentaerythritol polyacrylate (NK Ester A-DPH manufactured by SHIN-NAKAMURA CHEMICAL CO., LTD.), 0.33 parts by mass of a photopolymerization initiator (IRGACURE 1173 manufactured by BASF SE), and 10 parts by mass of methyl ethyl ketone (special grade chemical manufactured by Wako Pure Chemical Industries, Ltd.) were mixed, and the mixture was forcibly stirred for 3 minutes using an ultrasonic homogenizer (Model SONIFIER 450 manufactured by Branson Ultrasonics,) to obtain a coating agent. The coating agent was applied to an easy adhesive PET substrate (LUMIRROR U34 manufactured by TORAY INDUSTRIES, INC., thickness: 100 μm) using an automatic coating device with an applicator having a gap of 12.5 μm (IMC-70F0-C type manufactured by Imoto Machinery Co., Ltd., pulling speed: 10 mm/sec) to obtain a coating film. The resulting coating film was dried in an oven at 60° C. for one minute, and passed through an ultraviolet irradiation apparatus (J-Cure manufactured by JATEC, Model JUC1500, pulling speed: 0.4 m/min, integrated light amount: 2,000 mJ/cm$^2$) two times to cure, and thus a cured article containing hollow particles was prepared. Using #0000 steel wool, the cured article was slid ten times under a load of 500 g, the surface of the cured article was visually observed, and the scratch resistance was evaluated based on the following criteria.

Evaluation criteria:
Few flaws were observed: ⊙
Slight flaws were observed: ○
Many flaws were observed: Δ
The surface was totally scraped: ×
(Bending Resistance)

The bending resistance was evaluated by the bend test (cylindrical mandrel method) described in JIS K5600-5-1: 1999. In this test, the presence or absence of cracks in a cured resin layer of a test piece wound around a cylindrical mandrel was confirmed. The diameter of the mandrel was gradually reduced, and the diameter at which the cured resin layer cracked was defined as a value showing the bending resistance of the test piece. The smaller the value of the diameter was, the higher the evaluation of the bending resistance was.

Example 1

To a 2-L reactor equipped with a stirrer and a thermometer, 1,440 parts by mass of ion-exchanged water, 1.0 parts by mass of sodium p-styrenesulfonate, and 0.8 parts by mass of potassium persulfate were added, the temperature was raised to 70° C., and the inside was switched to a nitrogen atmosphere by nitrogen purge. 70 parts by mass of glycidyl methacrylate, 10 parts by mass of 3-methacryloxypropyltriethoxysilane, 1.6 parts by mass of n-octylmercaptan, and 80 parts by mass of toluene were mixed, the mixed solution was added dropwise to the reactor over 4 hours to perform a polymerization reaction, and thus polymer particles having a remaining epoxy group were obtained. Since toluene had been added to emulsion polymerization, polymer particles having the remaining epoxy group were swollen with toluene.

Then, in order to polymerize the remaining epoxy group, 40 parts by mass of ethylenediamine was added, and polymerization was performed at 70° C. for 24 hours. By a reaction of the epoxy group in the polymer particles, the polymer and toluene were phase-separated to obtain a dispersion liquid of hollow particles. 2,000 parts by mass of the dispersion liquid of hollow particles was cross flow-washed with 20,000 parts by mass of ion-exchanged water using a ceramic filter having a fine pore diameter of 50 nm, and excess ethylenediamine was removed. Then, concentration or addition of ion-exchanged water was appropriately performed so that the solid content became 10% by mass, and thus a 10 mass % dispersion liquid of hollow particles in water was obtained.

After 10 parts by mass of dodecylphosphoric acid was dissolved in 500 parts by mass of isopropyl alcohol, 500 parts by mass of the 10 mass % dispersion liquid of hollow particles in water was added, the mixture was stirred for 30 minutes using an internal ultrasonic homogenizer (Model SONIFIER 450 manufactured by Branson Ultrasonics), and thus a dispersion liquid of surface-treated hollow particles was obtained. Then, the dispersion liquid of surface-treated hollow particles was cross flow-washed with 5,000 parts by mass of isopropyl alcohol, concentration or addition of isopropyl alcohol was appropriately performed so that the solid content became 10% by mass, and thus a 10 mass % dispersion liquid of hollow particles in isopropyl alcohol was obtained.

50 parts by mass of 3-methacryloxypropyltrimethoxysilane was added to 500 parts by mass of the 10 mass % dispersion liquid of hollow particles in isopropyl alcohol, the mixture was stirred at 70° C. for 10 hours, and thus a dispersion liquid of hollow particles with a reactive group introduced therein was obtained. The dispersion liquid of surface-treated hollow particles was cross flow-washed with 5,000 parts by mass of isopropyl alcohol, isopropyl alcohol was added so that the solid content became 10% by mass, and thus a 10 mass % dispersion liquid of surface-treated hollow particles in isopropyl alcohol was obtained.

The resulting hollow particles had an average particle diameter of 69 nm, and a dispersed particle diameter in isopropyl alcohol of 102 nm, and were excellent in the dispersibility. The hollow ratio was as high as 29%, the phosphorus atom amount was 1.6% by mass, the sulfur atom amount was 0.2% by mass, and the reactive group introduction amount was 0.06. When the resulting hollow particles were used to prepare a film, and the scratch resistance was evaluated, few flaws were observed, and the film had excellent scratch resistance.

Example 2

A 10 mass % dispersion liquid of hollow particles in isopropyl alcohol was obtained in the same manner as in Example 1 except that 30 parts by mass of polyoxyethylene alkyl ether phosphoric acid was used in place of dodecylphosphoric acid, and 3-acryloxypropyltrimethoxysilane was used in place of 3-methacryloxypropyltrimethoxysilane.

The resulting hollow particles had an average particle diameter of 70 nm, and a dispersed particle diameter in isopropyl alcohol of 99 nm, and were excellent in the dispersibility. The hollow ratio was as high as 29%, the phosphorus atom amount was 0.5% by mass, the sulfur atom amount was 0.3% by mass, and the reactive group introduction amount was 0.14. When the resulting hollow particles were used to prepare a film, and the scratch resistance was evaluated, few flaws were observed, and the film had excellent scratch resistance.

Example 3

A 10 mass % dispersion liquid of hollow particles in isopropyl alcohol was obtained in the same manner as in Example 1 except that 13 parts by mass of dodecylbenzenesulfonic acid was used in place of dodecylphosphoric acid, and 25 parts by mass of 3-acryloxypropyltrimethoxysilane was used in place of 3-methacryloxypropyltrimethoxysilane.

The resulting hollow particles had an average particle diameter of 69 nm, and a dispersed particle diameter in isopropyl alcohol of 95 nm, and were excellent in the dispersibility. The hollow ratio was as high as 30%, the phosphorus atom amount was 0% by mass, the sulfur atom amount was 1.2% by mass, and the reactive group introduction amount was 0.07. When the resulting hollow particles were used to prepare a film, and the scratch resistance was evaluated, few flaws were observed, and the film had excellent scratch resistance.

Example 4

A 10 mass % dispersion liquid of hollow particles in isopropyl alcohol was obtained in the same manner as in Example 1 except that 68 parts by mass of glycidyl methacrylate and 2 parts by mass of methyl methacrylate were used in place of 70 parts by mass of glycidyl methacrylate, 30 parts by mass of polyoxyethylene alkyl ether phosphoric acid was used in place of dodecylphosphoric acid, and 3-methacryloxypropyltrimethoxysilane was not used.

The resulting hollow particles had an average particle diameter of 68 nm, and a dispersed particle diameter in isopropyl alcohol of 93 nm, and were excellent in the dispersibility. The hollow ratio was as high as 32%, the phosphorus atom amount was 0.5% by mass, the sulfur atom amount was 0.3% by mass, and the reactive group introduction amount was 0. When the resulting hollow particles were used to prepare a film, and the scratch resistance was evaluated, slight flaws were observed, but the film had excellent scratch resistance.

Example 5

A 10 mass % dispersion liquid of hollow particles in isopropyl alcohol was obtained in the same manner as in Example 1 except that 30 part as of polyoxyethylene alkyl ether phosphoric acid was used in place of dodecylphosphoric acid, and 30 parts by mass of 8-methacryloxyoctyltrimethoxysilane was used in place of 3-methacryloxypropyltrimethoxysilane. Further, the 10 mass % dispersion liquid of hollow particles in isopropyl alcohol was cross flow-washed with 5,000 parts by mass of methyl isobutyl ketone, methyl isobutyl ketone was added so that the solid content became 10% by mass, and thus a 10 mass % dispersion liquid of surface-treated hollow particles in methyl isobutyl ketone was obtained.

The resulting hollow particles had an average particle diameter of 68 nm, a dispersed particle diameter in methyl isobutyl ketone of 96 nm, and were excellent in the dispersibility. The hollow ratio was as high as 30%, the phosphorus atom amount was 0.6% by mass, the sulfur atom amount was 0.3% by mass, and the reactive group introduction amount was 0.06. When the resulting hollow particles were used to prepare a film, and the scratch resistance was evaluated, few flaws were observed, and the film had excellent scratch resistance.

Comparative Example 1

60 parts by mass of glycidyl methacrylate, 2 parts by mass of azobisisobutyronitrile, 90 parts by mass of cyclohexane, and 10 parts by mass of hexadecane were mixed to prepare an oil phase. The oil phase was added to an aqueous phase obtained by dissolving 2.0 parts by mass of sodium dodecylbenzenesulfonate in 1,440 parts by mass of ion-exchanged water, and the phases were forcibly dispersed for 2 hours using an ultrasonic homogenizer under an ice bath. The dispersion was placed in a 2-L reactor equipped with a stirrer and a thermometer, the inside was switched to a nitrogen atmosphere by nitrogen purge, and the materials were reacted at 60° C. for 4 hours. Then, in order to polymerize the remaining epoxy group, 40 parts by mass of ethyenediamine was added, and polymerization was performed at 70° C. for 24 hours to obtain a dispersion liquid of hollow particles. The resulting dispersion liquid was cross flow-washed with 20,000 parts by mass of ion-exchanged water using a 50 nm ceramic filter, and then washed with 20,000 parts by mass of isopropyl alcohol. Excess ethylenediamine was removed, and concentration or addition of isopropyl alcohol was appropriately performed so that the solid content became 10% by mass, and thus a 10 mass % dispersion liquid of hollow particles in isopropyl alcohol was obtained.

The resulting hollow particles had an average particle diameter of 98 nm, and a dispersed particle diameter in isopropyl alcohol of 452 nm, and were hollow particles having poor dispersibility in an organic solvent. The hollow ratio was as high as 35%, the phosphorus atom amount was 0% by mass, the sulfur atom amount was 0% by mass, and the reactive group introduction amount was 0. When the resulting hollow particles were used to prepare a film, and the scratch resistance was evaluated, the coating film surface was generally scraped from the substrate, and the film was inferior in the scratch resistance.

Comparative Example, 2

70 parts by mass of jER828 (manufactured by Mitsubishi Chemical Corporation, bisphenol A-type liquid epoxy resin, epoxy equivalent of 184 to 194), 90 parts by mass of toluene, and 10 parts by mass of hexadecane were mixed to prepare an oil phase. The oil phase was added to an aqueous phase obtained by dissolving 16 parts by mass of dodecyltrimethylammonium chloride in 1,440 parts by mass of ion-exchanged water, and the phases were forcibly dispersed for 2 hours using an ultrasonic homogenizer. The dispersion was placed in a 2-L reactor equipped with a stirrer and a thermometer, and in order to polymerize the epoxy group, 30 parts by mass of ethylenediamine was added, and the epoxy group was polymerized at 80° C. for 4 hours. 30 parts by mass of N-2-(aminoethyl)-3-aminopropyltrimthoxysilane was added, and the materials were further reacted for 4 hours to obtain a dispersion liquid of hollow particles. The resulting dispersion liquid was cross flow-washed with 20,000 parts by mass of ion-exchanged water using a 50 nm ceramic filter, and excess amines were removed. Then, concentration or addition of ion-exchanged water was appropriately performed so that the solid content became 10% by mass, and thus a 10 mass % dispersion liquid of hollow particles in water was obtained.

After 7.5 parts by mass of tetraethoxysilane was dissolved in 500 parts by mass of ethyl alcohol, 500 parts by mass of the 10 mass % dispersion liquid of hollow particles in water was added, the mixture was heated at 60° C. for 4 hours, and thus hollow particles that had been surface-treated with tetraethoxysilane were obtained. Then, the dispersion liquid of surface-treated hollow particles was cross flow-washed with 5,000 parts by mass of isopropyl alcohol, concentration or addition isopropyl alcohol was appropriately performed so that the solid content became 10% by mass, and thus a 10 mass % dispersion liquid of hollow particles in isopropyl alcohol was obtained.

2.5 parts by mass of 3-acryloxypropyltrimethoxysilane was added to 500 parts by mass of the 10 mass % dispersion liquid of hollow particles in isopropyl alcohol, the mixture was stirred at 60° C. for 4 hours, and thus a dispersion liquid of hollow particles with a reactive group introduced therein was obtained. The dispersion liquid of hollow particles with a reactive group introduced therein was cross flow-washed with 5,000 parts by mass of isopropyl alcohol, concentration or addition isopropyl alcohol was appropriately performed so that the solid content became 10% by mass, and thus a 10 mass % dispersion liquid of hollow particles in isopropyl alcohol was obtained.

The resulting hollow particles had an average particle diameter of 108 nm, and a dispersed particle diameter in isopropyl alcohol of 158 nm. The hollow ratio was as high as 32%, the phosphorus atom amount was 0% by mass, the sulfur atom amount was 0% by mass, and the reactive group introduction amount was 0.01. When the resulting hollow particles were used to prepare a film, and the scratch resistance was evaluated, the coating film surface was generally scraped from the substrate, and the film was inferior in the scratch resistance.

The following Table 1 summarizes raw materials used in producing the hollow particles and physical properties.

TABLE 1

|  |  |  | Unit | Example 1 | Example 2 | Example 3 | Example 4 | Example 5 | Comparative Example 1 | Comparative Example 2 |
|---|---|---|---|---|---|---|---|---|---|---|
| Raw material | Reactive monomer | Glycidyl methacrylate | Part by mass | 70 | 70 | 70 | 68 | 70 | 60 | — |
|  |  | Methyl methacrylate | Part by mass | — | — | — | 2 | — | — | — |
|  |  | jER828 | Part by mass | — | — | — | — | — | — | 70 |
|  |  | 3-Methacryloxypropyltriethoxysilane | Part by mass | 10 | 10 | 10 | 10 | 10 | — | — |
|  | Crosslinking agent | Ethylenediamine | Part by mass | 40 | 40 | 40 | 40 | 40 | 40 | 30 |
|  |  | N-2-(aminoethyl)-3-aminopropyltrimethoxysilane | Part by mass | — | — | — | — | — | — | 30 |
|  | Chain transfer agent | n-octylmercaptan | Part by mass | 1.6 | 1.6 | 1.6 | 1.6 | 1.6 | — | — |
|  | Polymerization initiator | Potassium persulfate | Part by mass | 0.8 | 0.8 | 0.8 | 0.8 | 0.8 | — | — |
|  |  | Azobisisobutyronitrile | Part by mass | — | — | — | — | — | 2 | — |
|  | Non-reactive solvent | Toluene | Part by mass | 80 | 80 | 80 | 80 | 80 | — | 90 |
|  |  | Cyclohexane | Part by mass | — | — | — | — | — | 90 | — |
|  |  | Hexadecane | Part by mass | — | — | — | — | — | 10 | 10 |
|  | Dispersion auxiliary agent | Sodium p-styrenesulfonate | Part by mass | 1.6 | 1.6 | 1.6 | 1.6 | 1.6 | — | — |
|  |  | Sodium dodecylbenzenesulfonate | Part by mass | — | — | — | — | — | 2.0 | — |
|  |  | Dodecyltrimethylammonium chloride | Part by mass | — | — | — | — | — | — | 16 |
|  | Surface treating agent | Dodecylphosphoric acid | Part by mass | 10 | — | — | — | — | — | — |
|  |  | Polyoxyethylene alkyl ether phosphoric acid | Part by mass | — | 30 | — | — | — | — | — |
|  |  | Dodecylbenzenesulfonic acid | Part by mass | — | — | 13 | 30 | 30 | — | — |
|  |  | Tetraethoxysilane | Part by mass | — | — | — | — | — | — | 7.5 |
|  |  | 3-Methacryloxypropyltrimethoxysilane | Part by mass | 50 | — | — | — | — | — | — |
|  |  | 3-Acryloxypropyltrimethoxysilane | Part by mass | — | 50 | 25 | — | — | — | 2.5 |
|  |  | 8-Methacryloxyoctyltrimethoxysilane | Part by mass | — | — | — | — | 30 | — | — |

TABLE 2

|  |  | Unit | Example 1 | Example 2 | Example 3 | Example 4 | Example 5 | Comparative Example 1 | Comparative Example 2 |
|---|---|---|---|---|---|---|---|---|---|
| Evaluation | Average particle diameter | nm | 69 | 70 | 69 | 68 | 68 | 98 | 108 |
|  | Dispersed particle diameter | nm | 102 | 99 | 95 | 93 | 96 | 452 | 158 |
|  | Hollow ratio | % | 29 | 29 | 30 | 32 | 30 | 35 | 32 |
|  | Phosphorus atom amount | % by mass | 1.6 | 0.5 | 0 | 0.5 | 0.6 | 0 | 0 |
|  | Sulfur atom amount | % by mass | 0.2 | 0.3 | 1.2 | 0.3 | 0.3 | 0 | 0 |
|  | Absorbance ratio α; Reactive group introduction amount | — | 0.06 | 0.14 | 0.07 | 0 | 0.06 | 0 | 0.01 |
|  | Scratch resistance | — | ⊙ | ⊙ | ⊙ | ○ | ⊙ | X | X |

By comparison with Comparative Examples 1 and 2, it was revealed that in Examples 1 to 5 of Table 2, hollow particles that have a small particle diameter, and are suitable for preparing a film having high scratch resistance can be produced.

Example 6 (Antireflection Film and Substrate with Antireflection Film)

20 parts by mass of the 10 mass % dispersion liquid of surface-treated hollow particles in isopropyl alcohol prepared in Example 1, 4 parts by mass of dipentaerythritol polyacrylate (NK Ester A-DPH manufactured by SHIN-NAKAMURA CHEMICAL CO., LTD.), and 0.20 parts by mass of a photopolymerization initiator (IRGACURE 1173 manufactured by BASF SE) were mixed, and the mixture was forcibly stirred for 5 minutes using an ultrasonic homogenizer to obtain a coating agent. 0.5 ml of the coating agent was added dropwise to a slide glass (S1111 manufactured by Matsunami Glass Ind., Ltd.) and applied using a spin coater (Model K-359SD1 manufactured by KYOWA RIKEN CO., LTD.) to obtain a coating film. The resulting coating film was dried at room temperature (about 25° C.) and under an ambient pressure. The dried coating film was cured by passing through an ultraviolet irradiation apparatus (J-Cure manufactured by JATEC, Model JUC1500, pulling speed: 0.4 m/min, integrated light amount: 2,000 mJ/cm$^2$) two times, and thereby a substrate with an antireflection film having an antireflection film formed on a glass substrate was prepared. When the reflectance from the upper surface of the substrate with an antireflection film from a light source of 550 nm and an incident angle of 8° was measured using an ultraviolet and visible spectrophotometer (Model UV-2450 manufactured by Shimadzu Corporation) equipped with an integrating sphere (Model ISR-2200 manufactured by Shimadzu Corporation), the reflectance was 7.3%, and lower than the reflectance of a slide glass with no antireflection film (8.4%), and the substrate was excellent in the antireflection properties.

Example 7 (Light Extraction Film and Substrate with Light Extraction Film)

20 parts by mass of the 10 mass % dispersion liquid of surface-treated hollow particles in isopropyl alcohol prepared in Example 1, 4 parts by mass of dipentaerythritol polyacrylate (NK Ester A-DPH manufactured by SHIN-NAKAMURA CHEMICAL CO., LTD.), and 0.20 parts by mass of a photopolymerization initiator (IRGACURE 1173 manufactured by BASF SE) were mixed, and the mixture was forcibly stirred for 5 minutes using an ultrasonic homogenizer to obtain a coating agent. 0.5 ml of the coating agent was added dropwise to a slide glass (S1111 manufactured by Matsunami Glass Ind., Ltd.) and applied using a spin coater (Model K-359SD1 manufactured by KYOWA RIKEN CO., LTD.) to obtain a coating film. The resulting coating film was dried at room temperature (about 25° C.) and under an ambient pressure. The dried coating film was cured by passing through an ultraviolet irradiation apparatus (J-Cure manufactured by JATEC, Model JUC1500, pulling speed: 0.4 m/min, integrated light amount: 2,000 mJ/cm$^2$) two times, and thereby a substrate with a light extraction film having a light extraction film formed on a glass substrate was prepared.

When the total luminous transmittance of the substrate with a light extraction film was measured using a haze meter, the total luminous transmittance of the substrate with a light extraction film was 94.5%, and was greater than the total luminous transmittance of a slide glass with no light extraction film (92.0%). Since the hollow particles were contained in the light extraction film, it is thought that the refractive index of the light extraction film was reduced, and reflection at an air interface was suppressed, so that the total luminous transmittance was improved.

The total luminous transmittance was measured in accordance with a method described in JIS K7361-1:1997 "Plastics—Determination of the Total Luminous Transmittance of Transparent Materials—Part 1: Single Beam instrument" by the following procedure.

That is, after the apparatus light source is stabilized, the prepared substrate with a light extraction film is measured by a light source (D65) and a double beam method using a haze meter (Model: HM-150 type manufactured by MURAKAMI COLOR RESEARCH LABORATORY CO., Ltd.). After a stabilization time of 30 minutes, measurement is performed, and it is confirmed that the light source has been stabilized. The number of tests is two, and an average thereof is used as the total luminous transmittance.

Example 8 (Light Guide Plate Ink and Light Guide Plate)

The 10 mass % dispersion liquid of surface-treated hollow particles in isopropyl alcohol prepared in Example 1 was washed with methyl ethyl ketone three times to obtain a 10 mass % dispersion liquid of hollow particles in methyl ethyl ketone. 45 parts by mass of the 10 mass % dispersion liquid of hollow particles in methyl ethyl ketone, 10 parts by mass of an acrylic-based resin (ACRYDIC A-181 manufactured by DIC CORPORATION, solid content of 45%), and 1.0 part by mass of a polyether phosphoric acid ester-based surfactant (Solsperse 41000 manufactured by The Lubrizol Corporation) were mixed to obtain a light diffusing composition (light guide plate ink).

The above-mentioned light diffusing composition was screen-printed on a 5-inch transparent acrylic plate so that the dot pitch was 500 μm and the dot diameter was 50 μm to obtain a light guide plate.

Example 9

20 parts by mass of the 10 mass % dispersion liquid of surface-treated hollow particles in isopropyl alcohol prepared in Example 1, 2 parts by mass of dipentaerythritol polyacrylate (NK Ester A-DPH manufactured by SHIN-NAKAMURA CHEMICAL CO., LTD.), 0.20 parts by mass of a photopolymerization initiator (IRGACURE 1173 manufactured by BASF SE), and 20 parts by mass of methyl ethyl ketone were mixed, and the mixture was forcibly stirred for 5 minutes using an ultrasonic homogenizer to obtain a coating agent. 1.0 ml of the coating agent was added dropwise to a polyethylene terephthalate substrate (LUMIRROR U34 manufactured by TORAY INDUSTRIES, INC.) having a thickness of 100 μm, applied using an applicator having a gap value of 25 μm, and dried at 60° C. for 2 minutes to obtain a coating film. The dried coating film was cured by passing through an ultraviolet irradiation apparatus (J-Cure manufactured JATEC, Model JUC1500, pulling speed: 0.4 m/min, integrated light amount: 2,000 mJ/cm$^2$) two times, and thereby a laminate including a cured resin layer containing hollow particles laminated on a polyethylene terephthalate substrate was prepared. The thickness of the resulting cured resin layer was about 2 μm.

When the cured resin layer was arranged on an outer side, and the laminate was bent using a mandrel bend testing machine based on JIS K5600-5-1:1999, the minimum diameter at which the cured resin layer began to crack was 2 mm, and the laminate had a high bending property.

Comparative Example 3

A laminate was prepared in the same manner as in Example 9 except that 9.8 parts by mass of a commercially available 20.5 mass % dispersion liquid of hollow silica particles in isopropyl alcohol (THRULYA 1110 manufactured by JGC C&C, particle diameter of 50 nm) was used in place of 20 parts by mass of the 10 mass % dispersion liquid of surface-treated hollow particles in isopropyl alcohol prepared in Example 1. The thickness of the resulting cured resin layer was about 2 μm.

When the cured resin layer was arranged on an outer side, and bent using mandrel bend testing machine based on JIS K5600-5-1:1999, the minimum diameter at which the cured resin layer began to crack was 10 mm, and the laminate had a low bending property.

What is claimed is:

1. Hollow particles comprising:
    a shell including at least one layer
    that contains a vinyl-based resin and a phosphorus atom,
    wherein the phosphorus atom is incorporated into only a part of the at least one layer,
    wherein the vinyl-based resin is a polymer obtained by crosslinking a polymer of a radical reactive monomer having at least an epoxy group or an oxetane group, with a crosslinkable monomer, and
    wherein said phosphorus atom exhibits a content of 0.2 to 5.00% by mass by fluorescent X-ray analysis.

2. The hollow particles according to claim 1, wherein when a ratio α (absorbance ratio α: A810/A1720) between absorbance at 810 cm$^{-1}$ (A810) and absorbance at 1720 cm$^{-1}$ (A1720) is calculated from an infrared absorption spectrum obtained by measuring said hollow particles by ATR-FTIR, said hollow particles exhibit an absorbance ratio α of 0.015 to 0.50.

3. The hollow particles according to claim 1, wherein said vinyl-based resin is an organic-inorganic hybrid vinyl-based resin containing a silicon component.

4. The hollow particles according to claim 1, having an average particle diameter of 10 to 150 nm.

5. The hollow particles according to claim 1, wherein said hollow particles have a surface treated with a silane-based coupling agent represented by the following general formula (I):

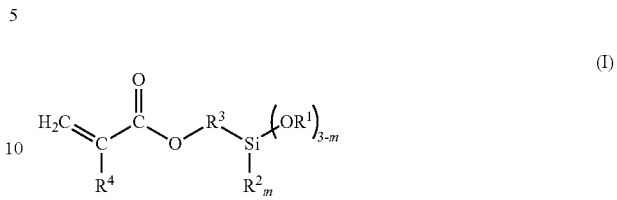

wherein R$^1$ represents independently a substituted or unsubstituted alkyl group having 1 to 6 carbon atoms, a substituted or unsubstituted alkoxyalkyl group having 2 to 4 carbon atoms, or a substituted or unsubstituted phenyl group; R$^2$ represents independently a substituted or unsubstituted alkyl group having 1 to 6 carbon atoms, a substituted or unsubstituted alkoxyalkyl group having 2 to 4 carbon atoms, or a substituted or unsubstituted phenyl group; R$^3$ represents a divalent organic group having 1 to 30 carbon atoms; R$^4$ represents a hydrogen atom or a methyl group; and m represents an integer of 0 to 2.

6. A dispersion liquid comprising the hollow particles according to claim 1.

7. A coating agent comprising the hollow particles according to claim 1.

8. A heat-insulating film comprising the hollow particles according to claim 1.

9. A laminate comprising at least a substrate, and a cured resin layer containing the hollow particles according to claim 1,
    wherein when subjected to a bend test (cylindrical mandrel method) described in JIS K5600-5-1: 1999, said cured resin layer has such a bending resistance that said cured resin layer begins to crack at a mandrel diameter of 8 mm or less.

10. The hollow particles according to claim 1, wherein said hollow particles have a hollow ratio of 10 to 90%.

11. The hollow particles according to claim 1, wherein said at least one layer further contains a sulfur atom, and
    wherein said sulfur atom exhibits a content of 0.2 to 5.00% by mass by fluorescent X-ray analysis.

* * * * *